United States Patent [19]

Shibuta et al.

[11] Patent Number: 5,537,522
[45] Date of Patent: Jul. 16, 1996

[54] DOCUMENT PROCESSING DEVICE FOR IMPROVING IMAGE QUALITY

[75] Inventors: Kazuo Shibuta; Tsuyoshi Tanaka, both of Yokohama, Japan

[73] Assignee: Fuji Xerox Co., Ltd., Japan

[21] Appl. No.: 377,240

[22] Filed: Jan. 24, 1995

[30] Foreign Application Priority Data

Jan. 31, 1994 [JP] Japan ................................ 6-025955

[51] Int. Cl.$^6$ .................................................. G06T 5/00
[52] U.S. Cl. ......................... 395/133; 395/141; 395/155; 395/161; 382/113
[58] Field of Search .................................. 395/133–135, 395/140, 141, 155–161; 382/113, 181, 190, 195

[56] References Cited

U.S. PATENT DOCUMENTS 5,325,441  7/1994  Hoecker .................................. 382/113

FOREIGN PATENT DOCUMENTS

| 61-32712  | 7/1986  | Japan . |
| 62-65126  | 3/1987  | Japan . |
| 64-15889  | 1/1989  | Japan . |
| 1-173178  | 7/1989  | Japan . |
| 2-22375   | 1/1990  | Japan . |
| 2-223275  | 9/1990  | Japan . |
| 3-18987   | 1/1991  | Japan . |
| 3-122773  | 5/1991  | Japan . |
| 3-109874  | 5/1991  | Japan . |
| 4-142679  | 5/1992  | Japan . |
| 4-172574  | 6/1992  | Japan . |
| 4-324577  | 11/1992 | Japan . |
| 5-739     | 1/1993  | Japan . |
| 5-73685   | 3/1993  | Japan . |

OTHER PUBLICATIONS

"7Q7 A Study on Evaluation Scales for Document Design Quality", Tsuyoshi Tanaka et al., 42th Joho Shori Gakkai (Information Processing Society) National Symposium 1991, pp. 3–331 –3–333.

"Presentation & Documentation", Fuji Xerox Co., Ltd., 1989, pp. 62–87.

"Business document no enshutsu giho II" (Technique for Making Business Documents Look Better II, Fuji Xerox Co., Ltd. and Coa Design Co., Ltd., 1992, pp. 105–123.

Primary Examiner—Almis R. Jankus
Attorney, Agent, or Firm—Oliff & Berridge

[57] ABSTRACT

A document processing device automatically changes chart designs in inputted documents. The processing device receives simple indications showing the user's intentions, improves the quality of designs in accordance with input indications and outputs the improved design. A document image inputting module receives the current document. A chart extracting module then extracts areas of charts included in the inputted document. A chart area dividing module receives output from the extracting module and divides the extracted chart area into elements such as character, line and graphic areas. An element attribute providing module receives the divided elements and determines the positional relations of the elements with respect to the whole chart. An output image forming module receives information from both the chart area dividing module and the element attribute providing module. The output image is formed by coloring image data corresponding to each element. The image is then output to a visualizing medium to be discerned by the user.

7 Claims, 47 Drawing Sheets

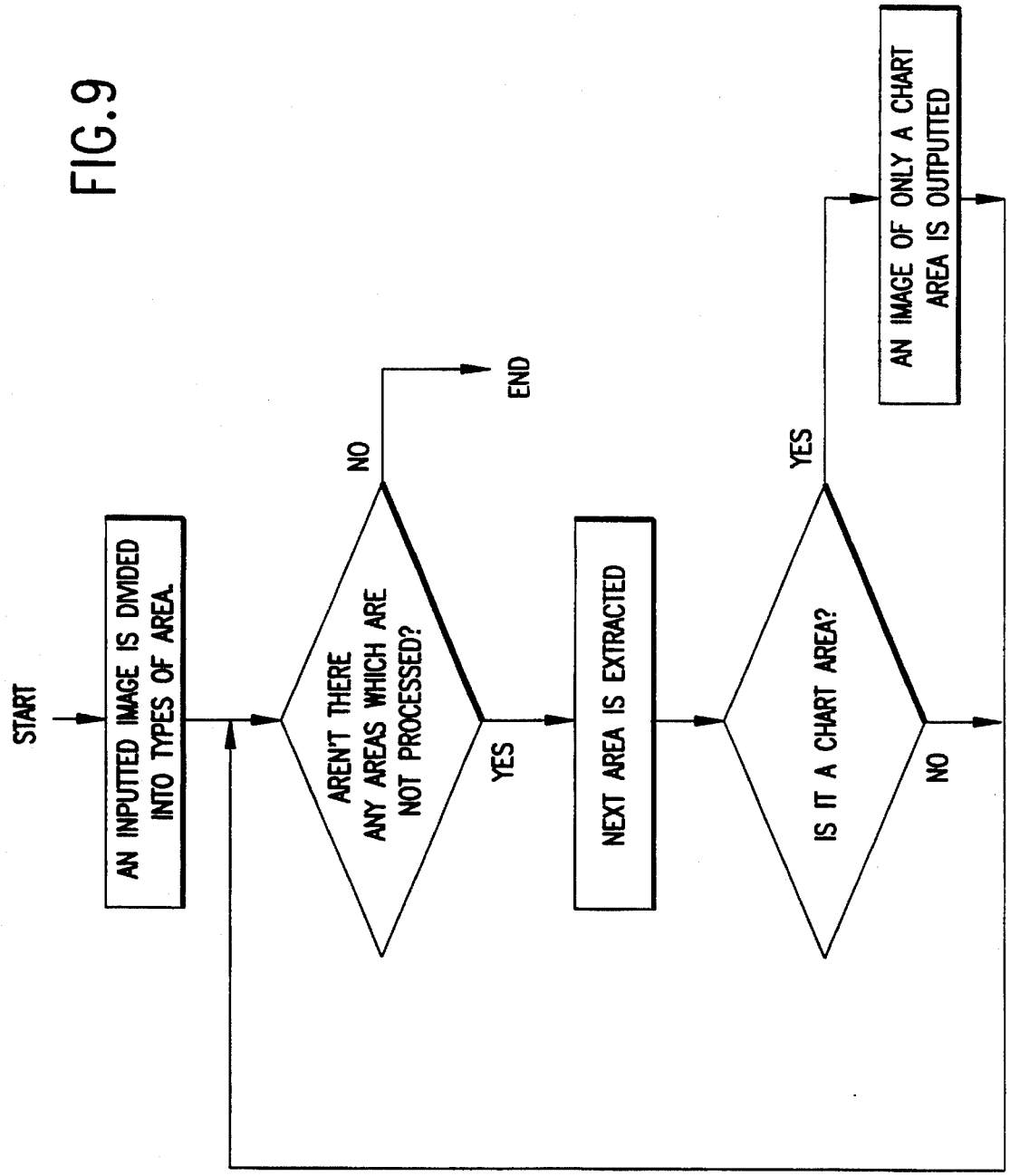

| NUMBERS OF ELEMENTS | TYPES OF ELEMENTS | COORDINATE VALUES (mm) $(X_0, Y_0), (W_1, Y_1), \ldots, (X_n, Y_n)$ |
|---|---|---|
| 1 | CHARACTER | (30.0, 145.0), (40.0, 150.0) |
| 2 | CHARACTER | (30.5, 195.0), (40.0, 200.0) |
| 3 | CHARACTER | (31.0, 245.0), (40.0, 250.0) |
| 4 | RECTANGLE | (40.0, 150.0), (170.0, 260.0) |
| 5 | LINE SEGMENT | (40.0, 165.0), $\cdots$ ,(170.0, 250.0) |
| 6 | LINE SEGMENT | (40.0, 165.0), $\cdots$ ,(170.0, 200.0) |
| 7 | LINE SEGMENT | (40.0, 155.0), $\cdots$ , (170.0, 170.0) |
| 8 | CHARACTER | (70.0, 165.0), (80.0, 170.0) |
| 9 | CHARACTER | (130.0, 145.0), (140.0, 150.0) |
| 10 | CHARACTER | (150.0, 175.0), (160.0, 180.0) |
| 11 | CHARACTER | (30.0, 265.0), (35.0, 270.0) |
| 12 | CHARACTER | (60.0, 265.0), (65.0, 270.0) |
| 13 | CHARACTER | (90.0, 265.0), (95.0, 270.0) |
| 14 | CHARACTER | (120.0, 265.0), (125.0, 270.0) |
| 15 | CHARACTER | (150.0, 265.0), (155.0, 270.0) |

FIG.12

| NUMBERS OF ELEMENTS | TYPES OF ELEMENTS | COORDINATE VALUES (mm) $(X_0, Y_0), (W_1, Y_1), \ldots, (X_n, Y_n)$ | ELEMENT ATTRIBUTES |
|---|---|---|---|
| 1 | CHARACTER | (30.0, 145.0), (40.0, 150.0) | Y GRADUATION 1 |
| 2 | CHARACTER | (30.5, 195.0), (40.0, 200.0) | Y GRADUATION 2 |
| 3 | CHARACTER | (31.0, 245.0), (40.0, 250.0) | Y GRADUATION 3 |
| 4 | RECTANGLE | (40.0, 150.0), (170.0, 260.0) | BACKGROUND 1 |
| 5 | LINE SEGMENT | (40.0, 165.0), ...., (170.0, 250.0) | BROKEN LINE 1 |
| 6 | LINE SEGMENT | (40.0, 165.0), ...., (170.0, 200.0) | BROKEN LINE 2 |
| 7 | LINE SEGMENT | (40.0, 155.0), ...., (170.0, 170.0) | BROKEN LINE 3 |
| 8 | CHARACTER | (70.0, 165.0), (80.0, 170.0) | DESCRIPTION 1 |
| 9 | CHARACTER | (130.0, 145.0), (140.0, 150.0) | DESCRIPTION 2 |
| 10 | CHARACTER | (150.0, 175.0), (160.0, 180.0) | DESCRIPTION 3 |
| 11 | CHARACTER | (30.0, 265.0), (35.0, 270.0) | X GRADUATION 1 |
| 12 | CHARACTER | (60.0, 265.0), (65.0, 270.0) | X GRADUATION 2 |
| 13 | CHARACTER | (90.0, 265.0), (95.0, 270.0) | X GRADUATION 3 |
| 14 | CHARACTER | (120.0, 265.0), (125.0, 270.0) | X GRADUATION 4 |
| 15 | CHARACTER | (150.0, 265.0), (155.0, 270.0) | X GRADUATION 5 |

FIG.13

| ELEMENTS ATTRIBUTES | AMOUNT OF CYAN % | AMOUNT OF MAGENTA % | AMOUNT OF YELLOW % | AMOUNT OF BLACK % |
|---|---|---|---|---|
| BROKEN LINE 1 | 100 | 30 | 20 | 0 |
| BROKEN LINE 2 | 60 | 70 | 0 | 0 |
| BROKEN LINE 3 | 10 | 50 | 60 | 0 |
| BACKGROUND | 20 | 10 | 20 | 0 |
| GRADUATION | 0 | 0 | 0 | 0 |
| DESCRIPTION 1 | 100 | 30 | 20 | 70 |
| DESCRIPTION 2 | 60 | 70 | 0 | 20 |
| DESCRIPTION 3 | 10 | 50 | 60 | 20 |

FIG. 14

| NUMBERS OF ELEMENTS | TYPES OF ELEMENTS | COORDINATE VALUES (mm) $(X_0, Y_0), (W_1, Y_1), \cdots, (X_n, Y_n)$ |
|---|---|---|
| 1 | SECTOR | (100.0, 200.0) <br> (100.0, 150.0), (140.0, 230.0) |
| 2 | SECTOR | (100.0, 200.0) <br> (140.0, 230.0), (90.0, 240.0) |
| 3 | SECTOR | (100.0, 200.0) <br> (90.0, 240.0), (50.0, 190.0) |
| 4 | SECTOR | (100.0, 200.0) <br> (50.0, 190.0), (60.0, 170.0) |
| 5 | SECTOR | (100.0, 200.0) <br> (60.0, 170.0), (100.0, 150.0) |
| 6 | CHARACTER | (80.0, 170.0), (90.0, 170,5) |
| 7 | CHARACTER | (120.0, 180.0), (130.0, 180,5) |
| 8 | CHARACTER | (70.0, 185.0), (80.0, 185,5) |
| 9 | CHARACTER | (70.0, 220.0), (80.0, 220,5) |
| 10 | CHARACTER | (100.0, 230.0), (110.0, 230,5) |

FIG.22

| NUMBERS OF ELEMENTS | TYPES OF ELEMENTS | COORDINATE VALUES (mm) $(X_0, Y_0), (W_1, Y_1), \cdots, (X_n, Y_n)$ | ELEMENT ATTRIBUTES |
|---|---|---|---|
| 1 | SECTOR | (100.0, 200.0) (100.0, 150.0), (140.0, 230.0) | SECTOR 1 |
| 2 | SECTOR | (100.0, 200.0) (140.0, 230.0), (90.0, 240.0) | SECTOR 2 |
| 3 | SECTOR | (100.0, 200.0) (90.0, 240.0), (50.0, 190.0) | SECTOR 3 |
| 4 | SECTOR | (100.0, 200.0) (50.0, 190.0), (60.0, 170.0) | SECTOR 4 |
| 5 | SECTOR | (100.0, 200.0) (60.0, 170.0), (100.0, 150.0) | SECTOR 5 |
| 6 | CHARACTER | (80.0, 170.0), (90.0, 170,5) | DESCRIPTION 5 |
| 7 | CHARACTER | (120.0, 180.0), (130.0, 180,5) | DESCRITPION 1 |
| 8 | CHARACTER | (70.0, 185.0), (80.0, 185,5) | DESCRIPTION 3 |
| 9 | CHARACTER | (70.0, 220.0), (80.0, 220,5) | DESCRIPTION 4 |
| 10 | CHARACTER | (100.0, 230.0), (110.0, 230,5) | DESCRIPTION 2 |

FIG.23

| NUMBERS OF ELEMENTS | TYPES OF ELEMENTS | COORDINATE VALUES (mm) $(X_0, Y_0), (W_1, Y_1), \cdots, (X_n, Y_n)$ | ELEMENT ATTRIBUTES |
|---|---|---|---|
| 1 | SECTOR | (100.0, 200.0) <br> (100.0, 150.0), (140.0, 230.0) | SECTOR (EMPHASIZED) |
| 2 | SECTOR | (100.0, 200.0) <br> (140.0, 230.0), (90.0, 240.0) | SECTOR 2 |
| 3 | SECTOR | (100.0, 200.0) <br> (90.0, 240.0), (50.0, 190.0) | SECTOR 3 |
| 4 | SECTOR | (100.0, 200.0) <br> (50.0, 190.0), (60.0, 170.0) | SECTOR 4 |
| 5 | SECTOR | (100.0, 200.0) <br> (60.0, 170.0), (100.0, 150.0) | SECTOR 5 |
| 6 | CHARACTER | (80.0, 170.0), (90.0, 170,5) | DESCRIPTION 5 |
| 7 | CHARACTER | (120.0, 180.0), (130.0, 180,5) | DESCRITPION 1 |
| 8 | CHARACTER | (70.0, 185.0), (80.0, 185,5) | DESCRIPTION 3 |
| 9 | CHARACTER | (70.0, 220.0), (80.0, 220,5) | DESCRIPTION 4 |
| 10 | CHARACTER | (100.0, 230.0), (110.0, 230,5) | DESCRIPTION 2 |

FIG.25

| ELEMENT ATTRIBUTES | AMOUNT OF CYAN % | AMOUNT OF MAGENTA % | AMOUNT OF YELLOW % | AMOUNT OF BLACK % |
|---|---|---|---|---|
| SECTOR 1 | 55 | 35 | 25 | 0 |
| SECTOR 2 | 45 | 15 | 15 | 0 |
| SECTOR 3 | 45 | 45 | 15 | 0 |
| SECTOR 4 | 60 | 30 | 40 | 0 |
| SECTOR 5 | 45 | 15 | 35 | 0 |
| SECTOR (EMPHASIZED) | 50 | 60 | 10 | 0 |
| DESCRIPTION 1 | 60 | 70 | 0 | 20 |
| DESCRIPTION 2 | 100 | 50 | 60 | 20 |
| DESCRIPTION 3 | 90 | 30 | 50 | 20 |
| DESCRIPTION 4 | 100 | 50 | 40 | 20 |
| DESCRIPTION 5 | 100 | 30 | 20 | 20 |

FIG.26

→ X COORDINATE

↓ Y COORDINATE

| NUMBERS OF ELEMENTS | TYPES OF ELEMENTS | COORDINATE VALUES (mm) $(X_0, Y_0), (W_1, Y_1), \cdots, (X_n, Y_n)$ |
|---|---|---|
| 1 | CHARACTER | (30.0, 145.0), (40.0, 150.0) |
| 2 | CHARACTER | (30.5, 195.0), (40.0, 200.0) |
| 3 | CHARACTER | (31.0, 245.0), (40.0, 250.0) |
| 4 | RECTANGLE | (40.0, 150.0), (170.0, 260.0) |
| 5 | RECTANGLE | (50.0, 230.0), (60.0, 260.0) |
| 6 | RECTANGLE | (60.0, 210.0), (70.0, 260.0) |
| 7 | RECTANGLE | (70.0, 220.0), (80.0, 160.0) |

· · ·

| | | |
|---|---|---|
| 14 | RECTAGLE | (130.0, 230.0), (140.0, 260.0) |
| 15 | RECTAGLE | (140.0, 210.0), (150.0, 260.0) |
| 16 | RECTAGLE | (150.0, 220.0), (160.0, 160.0) |
| 17 | CHARACTER | (60.0, 220.0), (70.0, 225.0) |
| 18 | CHARACTER | (70.0, 200.0), (80.0, 205.0) |
| 19 | CHARACTER | (80.0, 210.0), (90.0, 215.0) |
| 20 | CHARACTER | (50.0, 265.0), (70.0, 270.0) |
| 21 | CHARACTER | (80.0, 265.0), (100.0, 270.0) |
| 22 | CHARACTER | (110.0, 265.0), (130.0, 270.0) |
| 23 | CHARACTER | (140.0, 265.0), (160.0, 270.0) |

FIG.34

| NUMBERS OF ELEMENTS | TYPES OF ELEMENTS | COORDINATE VALUES (mm) $(X_0, Y_0), (W_1, Y_1), \cdots, (X_n, Y_n)$ | ELEMENT ATTRIBUTES |
|---|---|---|---|
| 1 | CHARACTER | (30.0, 145.0), (40.0, 150.0) | Y GRADUATION 1 |
| 2 | CHARACTER | (30.5, 195.0), (40.0, 200.0) | Y GRADUATION 2 |
| 3 | CHARACTER | (31.0, 245.0), (40.0, 250.0) | Y GRADUATION 3 |
| 4 | RECTANGLE | (40.0, 150.0), (170.0, 260.0) | BACKGROUND 1 |
| 5 | RECTANGLE | (50.0, 230.0), (60.0, 260.0) | BAR 1 |
| 6 | RECTANGLE | (60.0, 210.0), (70.0, 260.0) | BAR 2 |
| 7 | RECTANGLE | (70.0, 220.0), (80.0, 160.0) | BAR 3 |
| ⋮ | ⋮ | ⋮ | ⋮ |
| 14 | RECTANGLE | (130.0, 230.0), (140.0, 260.0) | BAR 1 |
| 15 | RECTANGLE | (140.0, 210.0), (150.0, 260.0) | BAR 2 |
| 16 | RECTANGLE | (150.0, 220.0), (160.0, 160.0) | BAR 3 |
| 17 | CHARACTER | (60.0, 220.0), (70.0, 225.0) | DESCRIPTION 1 |
| 18 | CHARACTER | (70.0, 200.0), (80.0, 205.0) | DESCRIPTION 2 |
| 19 | CHARACTER | (80.0, 210.0), (90.0, 215.0) | DESCRIPTION 3 |
| 20 | CHARACTER | (50.0, 265.0), (70.0, 270.0) | X GRADUATION 1 |
| 21 | CHARACTER | (80.0, 265.0), (100.0, 270.0) | X GRADUATION 2 |
| 22 | CHARACTER | (110.0, 265.0), (130.0, 270.0) | X GRADUATION 3 |
| 23 | CHARACTER | (140.0, 265.0), (160.0, 270.0) | X GRADUATION 4 |

FIG.35

| ELEMENT ATTRIBUTES | AMOUNT OF CYAN % | AMOUNT OF MAGENTA % | AMOUNT OF YELLOW % | AMOUNT OF BLACK % |
|---|---|---|---|---|
| BAR 1 | 45 | 15 | 15 | 0 |
| BAR 2 | 45 | 45 | 15 | 0 |
| BAR 3 | 60 | 30 | 40 | 0 |
| BAR 4 | 45 | 15 | 35 | 0 |
| BAR 5 | 55 | 35 | 25 | 0 |
| BACKGROUND | 20 | 10 | 20 | 0 |
| GRADUATION | 0 | 0 | 0 | 70 |
| DESCRIPTION 1 | 100 | 30 | 20 | 20 |
| DESCRIPTION 2 | 60 | 70 | 0 | 20 |
| DESCRIPTION 3 | 10 | 50 | 60 | 20 |

FIG.36

→ X COORDINATE

↓ Y COORDINATE

SALES OF MAIN ITEMS OF EACH COMPANY

OOOOOOOOOOOOOOOOOOOOO
OOOOOOOOOOOOOOOOOOOOO
THIS REPORT DESCRIBES THE SEARCHED RESULTS OF THE '94 SALES OF RECENT MAIN ITEMS OF A, B, C AND D COMPANY.

1000

PC WS
500
FAX

0
A COMPANY  B COMPANY  C COMPANY  D COMPANY

\* ANNOUNCED BY E NEWSPAPER PUBLISHING COMPANY

FIG.37

| NUMBERS OF ELEMENTS | TYPES OF ELEMENTS | COORDINATE VALUES (mm) $(X_0, Y_0), (W_1, Y_1), \cdots, (X_n, Y_n)$ |
|---|---|---|
| 1 | CHARACTER | (30.0, 145.0), (40.0, 150.0) |
| 2 | CHARACTER | (30.5, 195.0), (40.0, 200.0) |
| 3 | CHARACTER | (31.0, 245.0), (40.0, 250.0) |
| 4 | RECTANGLE | (40.0, 150.0), (170.0, 260.0) |
| 5 | RECTANGLE | (50.0, 230.0), (60.0, 260.0) |
| 6 | RECTANGLE | (60.0, 210.0), (70.0, 260.0) |
| 7 | RECTANGLE | (70.0, 220.0), (80.0, 160.0) |
| 8 | RECTANGLE | (70.0, 220.0), (80.0, 160.0) |
| 9 | RECTANGLE | (70.0, 220.0), (80.0, 160.0) |
| 10 | RECTANGLE | (70.0, 220.0), (80.0, 160.0) |
| ⋮ | ⋮ | ⋮ |
| 17 | RECTANGLE | (130.0, 230.0), (140.0, 260.0) |
| 18 | RECTANGLE | (140.0, 210.0), (150.0, 260.0) |
| 19 | RECTANGLE | (150.0, 220.0), (160.0, 160.0) |
| 20 | CHARACTER | (55.0, 160.0), (65.0, 165.0) |
| 21 | CHARACTER | (55.0, 170.0), (65.0, 175.0) |
| 22 | CHARACTER | (55.0, 180.0), (65.0, 185.0) |
| 23 | CHARACTER | (50.0, 265.0), (70.0, 270.0) |
| 24 | CHARACTER | (80.0, 265.0), (100.0, 270.0) |
| 25 | CHARACTER | (110.0, 265.0), (130.0, 270.0) |
| 26 | CHARACTER | (140.0, 265.0), (160.0, 270.0) |

FIG.44

| NUMBERS OF ELEMENTS | TYPES OF ELEMENTS | COORDINATE VALUES (mm) $(X_0, Y_0), (W_1, Y_1), \cdots, (X_n, Y_n)$ | ELEMENT ATTRIBUTES |
|---|---|---|---|
| 1 | CHARACTER | (30.0, 145.0), (40.0, 150.0) | Y GRADUATION 1 |
| 2 | CHARACTER | (30.5, 195.0), (40.0, 200.0) | Y GRADUATION 2 |
| 3 | CHARACTER | (31.0, 245.0), (40.0, 250.0) | Y GRADUATION 3 |
| 4 | RECTANGLE | (40.0, 150.0), (170.0, 260.0) | BACKGROUND 1 |
| 5 | RECTANGLE | (45.0, 160.0), (50.0, 165.0) | ? |
| 6 | RECTANGLE | (45.0, 170.0), (50.0, 175.0) | ? |
| 7 | RECTANGLE | (45.0, 180.0), (50.0, 185.0) | ? |
| 8 | RECTANGLE | (50.0, 230.0), (60.0, 260.0) | BAR 1 |
| 9 | RECTANGLE | (60.0, 210.0), (70.0, 260.0) | BAR 2 |
| 10 | RECTANGLE | (70.0, 220.0), (80.0, 160.0) | BAR 3 |
| ⋮ | | | |
| 17 | RECTANGLE | (130.0, 230.0), (140.0, 260.0) | BAR 1 |
| 18 | RECTANGLE | (140.0, 210.0), (150.0, 260.0) | BAR 2 |
| 19 | RECTANGLE | (150.0, 220.0), (160.0, 160.0) | BAR 3 |
| 20 | CHARACTER | (55.0, 160.0), (65.0, 165.0) | ? |
| 21 | CHARACTER | (55.0, 170.0), (65.0, 175.0) | ? |
| 22 | CHARACTER | (55.0, 180.0), (65.0, 185.0) | ? |
| 23 | CHARACTER | (50.0, 265.0), (70.0, 270.0) | X GRADUATION 1 |
| 24 | CHARACTER | (80.0, 265.0), (100.0, 270.0) | X GRADUATION 2 |
| 25 | CHARACTER | (110.0, 265.0), (130.0, 270.0) | X GRADUATION 3 |
| 26 | CHARACTER | (140.0, 265.0), (160.0, 270.0) | X GRADUATION 4 |

FIG.45

| NUMBERS OF ELEMENTS | TYPES OF ELEMENTS | COORDINATE VALUES (mm) $(X_0, Y_0), (W_1, Y_1), \cdots, (X_n, Y_n)$ | ELEMENT ATTRIBUTES |
|---|---|---|---|
| 1 | CHARACTER | (30.0, 145.0), (40.0, 150.0) | Y GRADUATION 1 |
| 2 | CHARACTER | (30.5, 195.0), (40.0, 200.0) | Y GRADUATION 2 |
| 3 | CHARACTER | (31.0, 245.0), (40.0, 250.0) | Y GRADUATION 3 |
| 4 | RECTANGLE | (40.0, 150.0), (170.0, 260.0) | BACKGROUND 1 |
| 5 | RECTANGLE | (45.0, 160.0), (50.0, 165.0) | BAR 1 |
| 6 | RECTANGLE | (45.0, 170.0), (50.0, 175.0) | BAR 2 |
| 7 | RECTANGLE | (45.0, 180.0), (50.0, 185.0) | BAR 3 |
| 8 | RECTANGLE | (50.0, 230.0), (60.0, 260.0) | BAR 1 |
| 9 | RECTANGLE | (60.0, 210.0), (70.0, 260.0) | BAR 2 |
| 10 | RECTANGLE | (70.0, 220.0), (80.0, 160.0) | BAR 3 |
| ⋮ | | | |
| 17 | RECTANGLE | (130.0, 230.0), (140.0, 260.0) | BAR 1 |
| 18 | RECTANGLE | (140.0, 210.0), (150.0, 260.0) | BAR 2 |
| 19 | RECTANGLE | (150.0, 220.0), (160.0, 160.0) | BAR 3 |
| 20 | CHARACTER | (55.0, 160.0), (65.0, 165.0) | DESCRIPTION 1 |
| 21 | CHARACTER | (55.0, 170.0), (65.0, 175.0) | DESCRIPTION 2 |
| 22 | CHARACTER | (55.0, 180.0), (65.0, 185.0) | DESCRIPTION 3 |
| 23 | CHARACTER | (50.0, 265.0), (70.0, 270.0) | X GRADUATION 1 |
| 24 | CHARACTER | (80.0, 265.0), (100.0, 270.0) | X GRADUATION 2 |
| 25 | CHARACTER | (110.0, 265.0), (130.0, 270.0) | X GRADUATION 3 |
| 26 | CHARACTER | (140.0, 265.0), (160.0, 270.0) | X GRADUATION 4 |

FIG.46

DOCUMENT PROCESSING DEVICE FOR IMPROVING IMAGE QUALITY

FIELD OF THE INVENTION

The present invention relates to a document processing device provided with functions to output documents after improving automatically the quality of the designs of the documents in accordance with simple indications of users.

BACKGROUND OF THE INVENTION

In recent years, professional quality documents have been easily made in general offices in accordance with the widespread use of document making devices such as DTP (Desk Top Publishing) and word processors, and other devices of high quality. Various parameters such as page layout of documents and, type or size of characters increasingly available if users having knowledge and experience spend sufficient time on making documents high quality, documents can be obtained.

For general users, however, as complicated operations must be mastered to handle advanced document processors, and further, as it is difficult for them to select the right values of the wide-ranged parameters to make documents of high quality which satisfy their needs, resultant documents may be of a lesser quality.

The function of reading contents of paper documents and outputting copies after processing them is included in many copying machines. Despite the fact the basic function of a copying machine is to output copies which are faithful to the original documents, copying machines including processing functions of documents as described in Japanese unexamined patent publication number Hei 2-223275 have been developed in accordance with the widespread use of digital copying machines.

The above described art, however, is not yet very useful, since it is necessary for users to indicate detail the portions to be processed and how to process them, and very complicated operations must be carried out to handle the devices. These complications increase the difficulty of making documents of high quality satisfying the intentions of the users. Particularly, the color operations involved in charts, wherein bars of a bar chart, sectors of a circular chart or broken lines of a broken line chart are individually colored, are very complicated, and further, if the users do not know much regarding color arrangement, it is very difficult to make outputted documents high quality.

Japanese unexamined patent publications number Hei 3-109874 and number Hei 3-122773 describe digital copying machines with which users who do not know much regarding color arrangement or document designing can realize coloring documents or improving appearance of documents. These publications show only the art wherein characters in color images are shown by complementary colors (described in Japanese unexamined patent publication number Hei 3-109874) and the art wherein a copying machine only distinguishes characters of handwriting documents from graphics in them and realizes arrangement functions such as arrangement of characters or straightening lines of graphics (described in Japanese unexamined patent publication number Hei 3-122773). These developments are not sufficient to reflect intentions of users or to output documents to which processing is applied to make them of high quality design.

SUMMARY OF THE INVENTION

It is an object of the present invention to provide a document processing device free of the defects found in the conventional art.

It is another object of the present invention to provide a document processing device that changes automatically designs of charts included in inputted documents by receiving simple indications that show intentions of users and outputs the documents after improving the quality of the designs in accordance with the indications.

Additional objects and advantages of the invention will be set forth in part in the following description and in part will be apparent from the description, or may be learned by practice of the invention.

In one aspect of the present invention, as shown in FIG. 1, the document processing device comprises a document image holding module for holding inputted documents as digital images. A chart area extracting module extracts areas of charts included in document images held by the document image holding device. A chart area dividing module divides a chart area extracted by the chart area extracting module into elements such as a character, a line and a graphic and for extracting a type and a coordinate value of each element. An element attribute providing determines, for each of the elements divided by chart area dividing module, positional relation with respect to the whole chart (and association with another element regarding characteristics such as color of a document to be outputted, if there is) in accordance with the coordinate value of each element and for providing such data as an element attribute, to which a number is provided type by type of elements, to each element. An output output image forming module extracts image data corresponding to each element divided by the chart area dividing from a document image held by the document image holding an output image by coloring image data corresponding to each element, which is identified by an element attribute provided by the element attribute providing module, in accordance with a parameter value corresponding to each element attribute of a color arrangement parameter table regarding coloring a chart. Finally, a and visualizing module visualizes a document image formed by the output image forming means 5 on a visualizing medium.

In another aspect of the present invention, as shown in FIG. 2, the document processing device described above comprises a logical attribute indicating means module for indicating logical attributes such as emphasis and association, which are not shown in original documents and are based on intentions of a user, to elements of a chart. The above described element attribute providing module makes the portions indicated by the logical attribute indicating module correspond to elements divided by the chart area dividing module and changes the element attributes of the elements in question in accordance with the indicated logical attributes. Additionally, it determines, for each of the elements divided by the chart area dividing module, positional relation with respect to the whole chart (and association with another element regarding characteristics such as color of a document to be outputted, if there is) in accordance with the coordinate value of each element and for providing such data as an element attribute, to which a number is provided type by type of elements, to each element.

In another aspect of the present invention, as shown in FIG. 3, the above described document processing device comprises a: design indicating module for selecting and indicating designs corresponding to the intentions of a user among designs such as coloring principal elements of a chart individually, coloring background portion or coloring characters. A color arrangement parameter selecting module selects the optimum parameter table among a plurality of color arrangement parameter tables regarding coloring charts. Finally, the finally, the output image forming module extracts image data corresponding to each element divided by the chart area dividing module from a document image held by the document image holding module and forms an output image by coloring image data corresponding to each element, which is identified by an element attribute provided by element attribute providing module, in accordance with a parameter value, which corresponds to each element attribute, of a color arrangement parameter table selected by the color arrangement parameter selecting module.

In another aspect of the present invention, as shown in FIG. 4, the document processing device comprises a: logical attribute indicating device for indicating logical attributes such as emphasis and association, which are not shown in original documents and are based on intentions of a user, to elements of a chart. A design indicating module that selects and indicates designs corresponding to the intentions of a user from designs such as coloring principal elements of a chart individually, coloring background portion or coloring characters. A color arrangement parameter selecting module selects the optimum parameter table from a plurality of color arrangement parameter tables regarding coloring charts, referring to the intentions of a user that are indicated by the design indicating module.

The above described element attribute providing means determines, for each of the elements divided by the chart area dividing module, positional relation with respect to the whole chart (and association with another element regarding characteristics such as color of a document to be outputted, if there is) in accordance with the coordinate value of each element and provides such data as an element attribute, to which a number is provided type by type of elements, to each element. It makes the portions indicated by the logical attribute indicating module correspond to elements divided by the chart area dividing module and changes element attributes of the elements in question in accordance with the indicated logical attributes. The above described output image forming module extracts image data corresponding to each element divided by the chart area dividing module from a document image held by the document image holding module and forms an output image by coloring image data corresponding to each element identified by the an element attribute provided by element attribute providing module, in accordance with a parameter value, which corresponds to each element attribute, of a color arrangement parameter table selected by the color arrangement parameter selecting module.

Chart area extracting means 2 extracts the chart areas from document images including elements such as a character and a graphic and which are held by the document image holding module. The chart area dividing module not only divides an extracted chart area into elements such as a character, a line segment and a closed area of an element such as a bar, but also produces data including a type and a coordinate value of each element (Hereinafter, this data is referred to as "chart structure data".) The element attribute providing module determines, for each of the elements divided by the chart area dividing module, positional relation with respect to the whole chart (and association with another element regarding characteristics such as color of a document to be outputted, if there is) and identifies which part of the chart it acts, in accordance with the chart structure data. Further, the element attribute providing device provides such data (data showing which part of the chart each element acts) to the chart structure data as element attributes and sends the chart structure data with the element attributes to the output image forming module. The output image forming module receives an inputted document image from the document image holding module, images of elements from the chart area dividing module and chart structure data from the element attribute providing module. The output image forming module converts, referring to a color arrangement parameter table regarding coloring a chart and stored beforehand, characteristics, such as color, of image data corresponding to each element divided by the chart area dividing module in accordance with a parameter value corresponding to an element attribute of each element, forms an output image and sends it to the visualizing module. With a document processing device according to the present invention, users can easily make visually accept documents satisfying their intended purposes, based on original documents of recording media such as papers, even if the users do not have knowledge of document designing. Because characters and graphics are individually colored, each of them can be legible.

In another aspect of the present invention, the logical attribute indicating module indicates afterwards logical meanings such as local emphasis or association, which are not shown in inputted monochrome documents. With the logical attribute indicating module users can make charts wherein indicated portions are emphasized or associated with the optimum color arrangement by simple indications of types of charts and portions to be emphasized or associated, even if they do not have knowledge of color arrangement. Thus, they can easily make visually acceptable documents satisfying their intended purposes.

In another aspect of the present invention, the design indicating module shows designs corresponding to the type of the chart selected and indicated so that a user can select designs in accordance with his intentions. If buttons are pressed, the design indicating device sends the data corresponding to the indication to color arrangement parameter selecting module arrangement parameter selecting module selects a parameter table indicated by the design indicating module and corresponding to the user's intentions and sends it to the output image forming module. With the present invention, the user can make charts colored with the optimum color arrangement easily only by indicating the type of chart and selecting the displayed designs, even if he does not have knowledge of designing or color arrangement. He can make easily colorful and visually attractive documents, such as charts, satisfying this intended purpose. regarding charts.

In another aspect of the present invention, a user can make charts colored with the optimum color arrangement only by indicating the type of chart and selecting displayed designs, even if he does not have knowledge of designing or color arrangement. Further, he can make charts wherein indicated portions are emphasized or associated with the optimum color arrangement only by simple indications of the portions to be emphasized or associated. With this system, he can easily make colorful and visually attractive documents, such as charts, satisfying his intended purposes.

BRIEF DESCRIPTION OF THE DRAWINGS

The manner by which the above objects and the other objects, features and advantages of the preset invention are attained will be fully evident from the following detailed description when it is considered in light of the accompanying drawings, wherein:

FIG. 9 is a flowchart of the processes carried out by the chart area extracting module used in the first embodiment according to the present invention;

FIG. 12 is an example of chart structure data outputted by the chart area dividing module used in the first embodiment according to the present invention;

FIG. 13 is an example of chart structure data to which element attributes are provided;

FIG. 14 is an example of a color arrangement parameter regarding coloring a broken line chart;

FIG. 22 is an example of chart structure data outputted by the chart area dividing module used in the second embodiment according to the present invention;

FIG. 23 is an example of chart structure data to which element attributes are provided;

FIG. 25 shows an example of chart structure data wherein a part of element attributes is changed;

FIG. 26 shows an example of a color arrangement parameter regarding coloring a circular chart;

FIG. 34 shows an example of chart structure data outputted by the chart area dividing module used in the third embodiment;

FIG. 35 shows an example of chart structure data to which element attributes are provided;

FIG. 36 shows an example of a color arrangement parameter regarding coloring a bar chart;

FIG. 37 shows an example of an outputted image wherein a bar chart is colored;

FIG. 44 shows an example of chart structure data outputted by the chart area dividing module used in the fourth embodiment according to the present invention;

FIG. 45 shows an example of chart structure data to which element attributes are provided;

FIG. 46 shows an example of chart structure data wherein a part of element attributes is changed.

DETAILED DESCRIPTION OF THE INVENTION

EMBODIMENT 1

Figure 1:
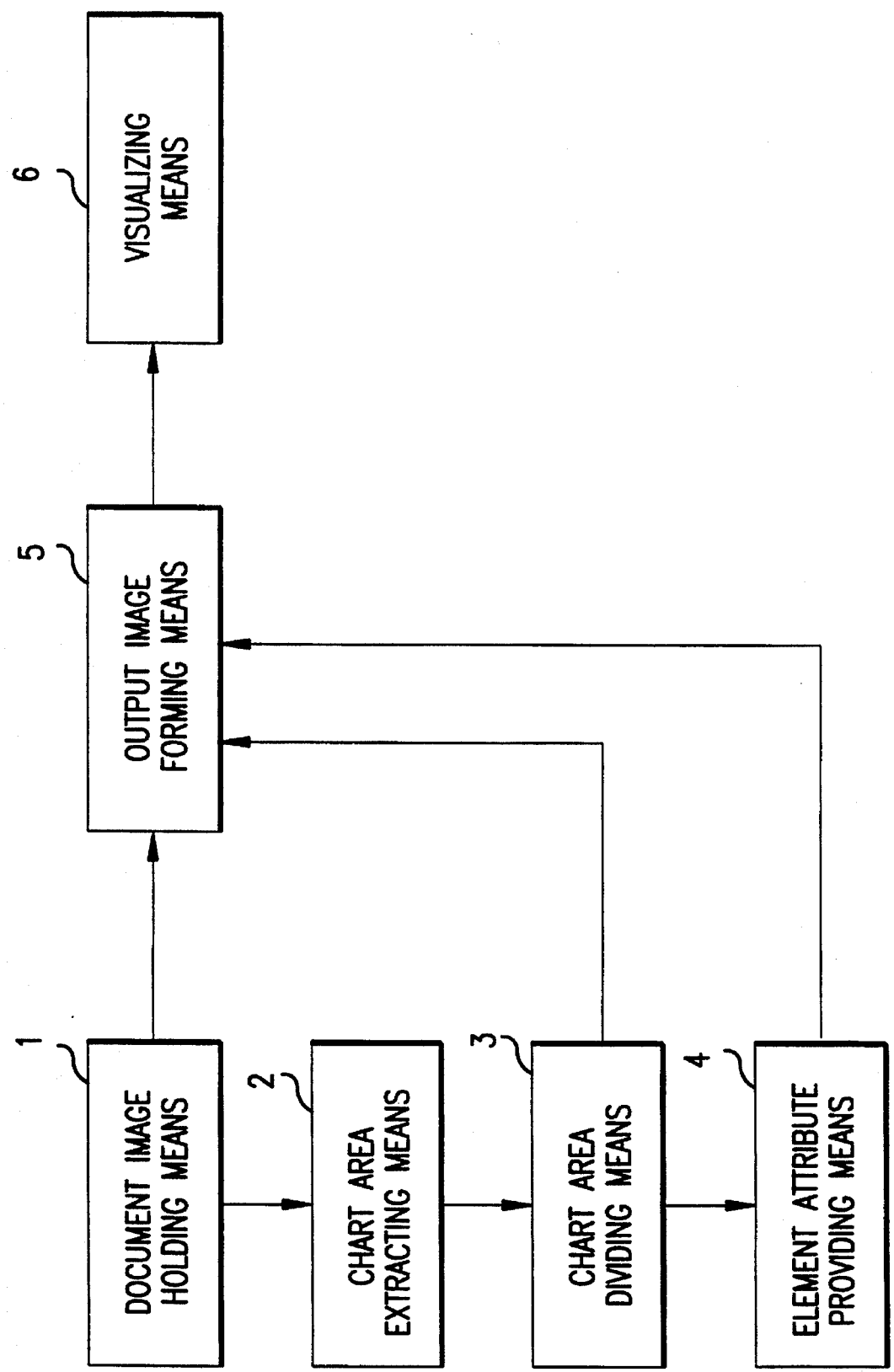
FIG. 1 shows in the document processing device according to one aspect of the present invention.
Figure 2:
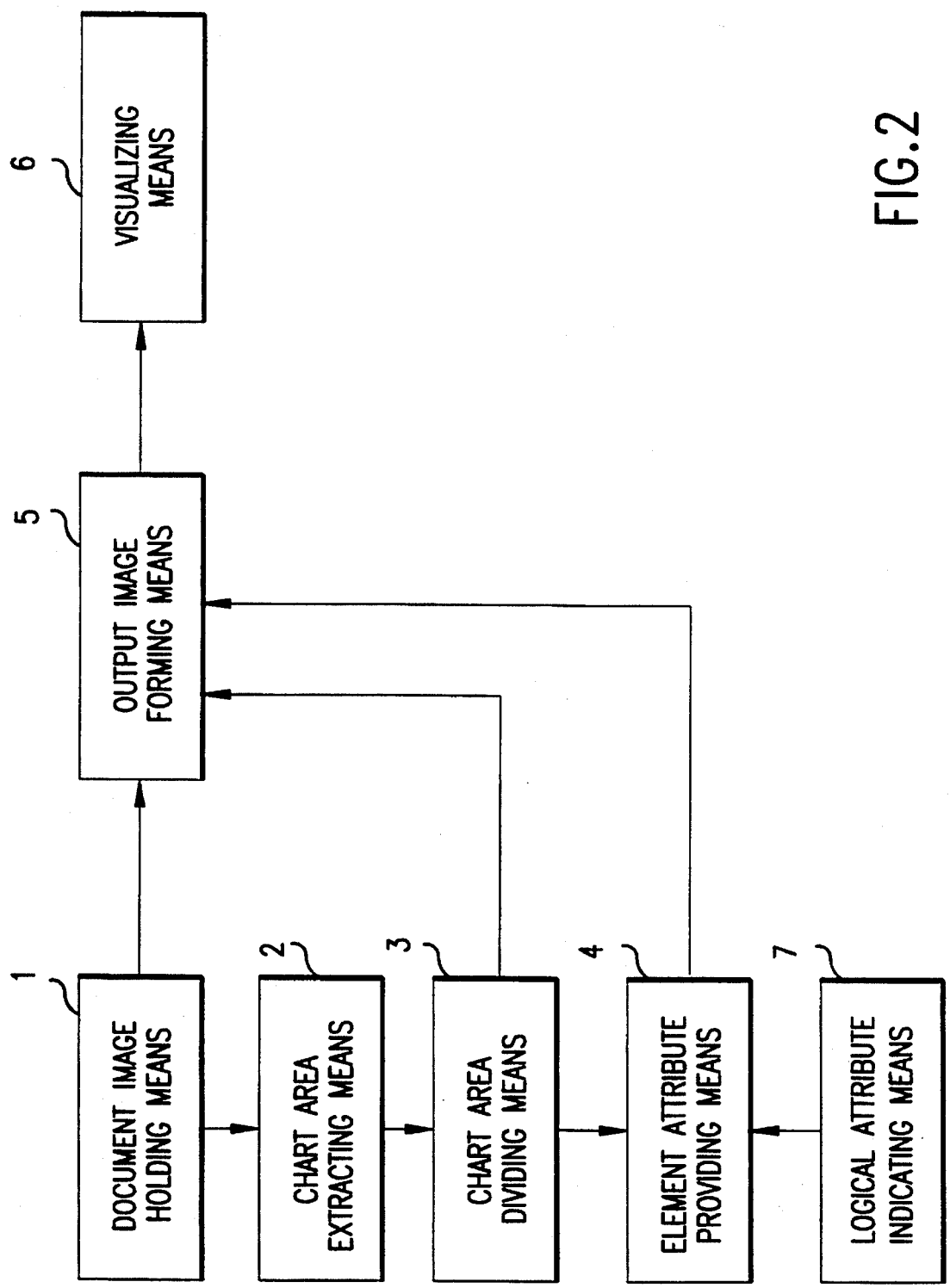
FIG. 2 shows in the document processing device according to another aspect of the present invention.
Figure 3:
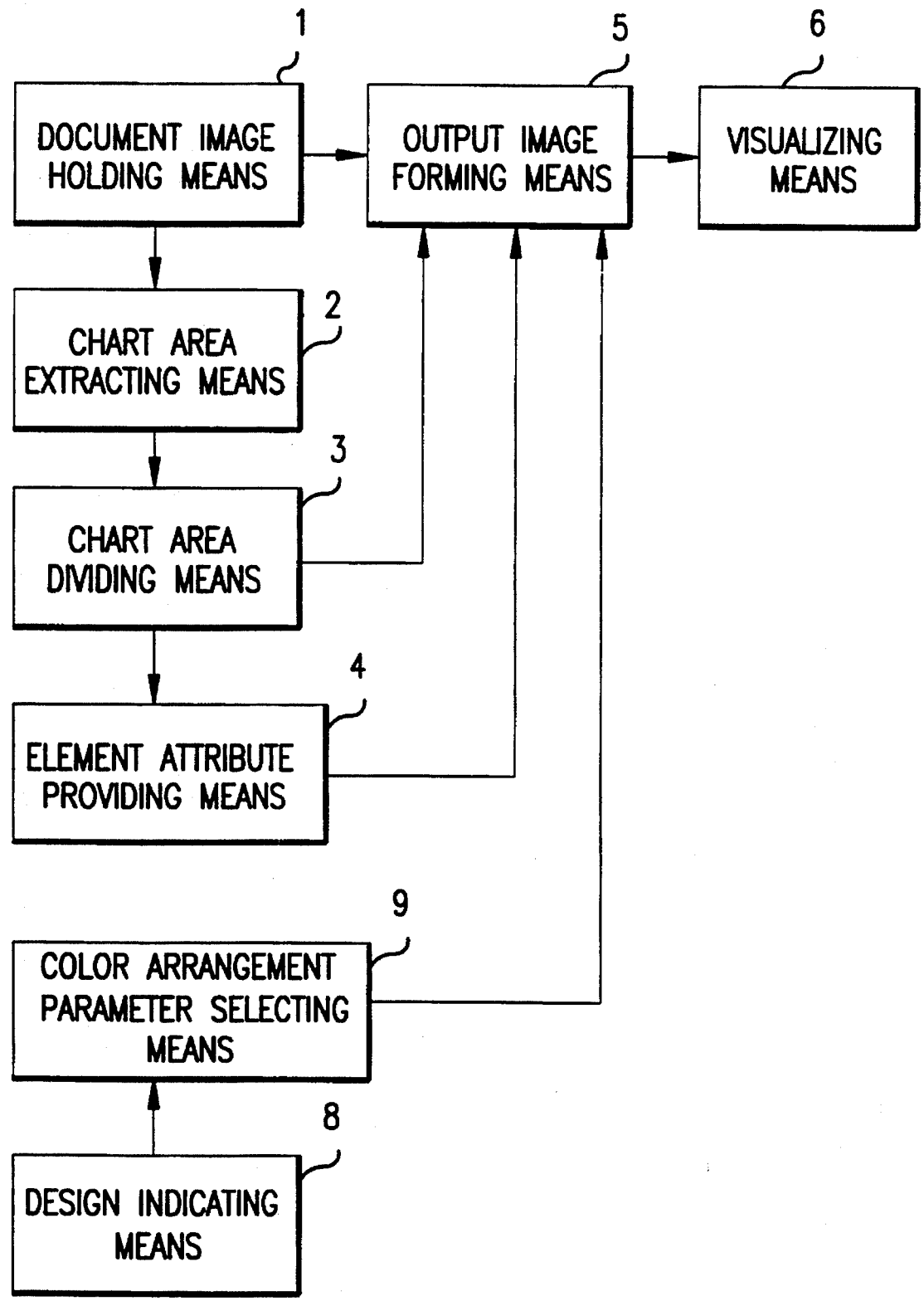
FIG. 3 shows in the document processing device according to another aspect of the present invention.
Figure 4:
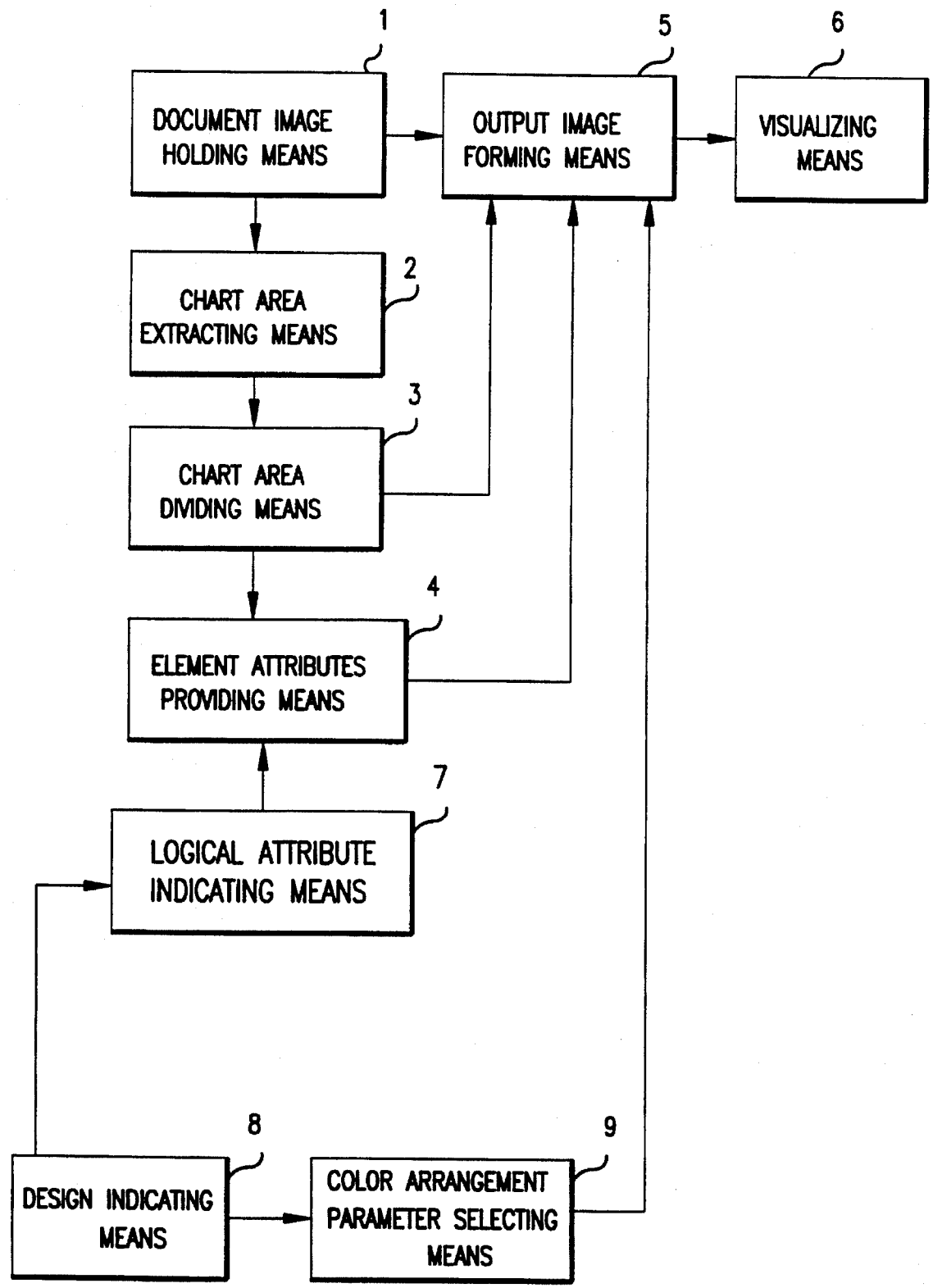
FIG. 4 shows in the document processing device according to another aspect of the present invention.
Figure 5:
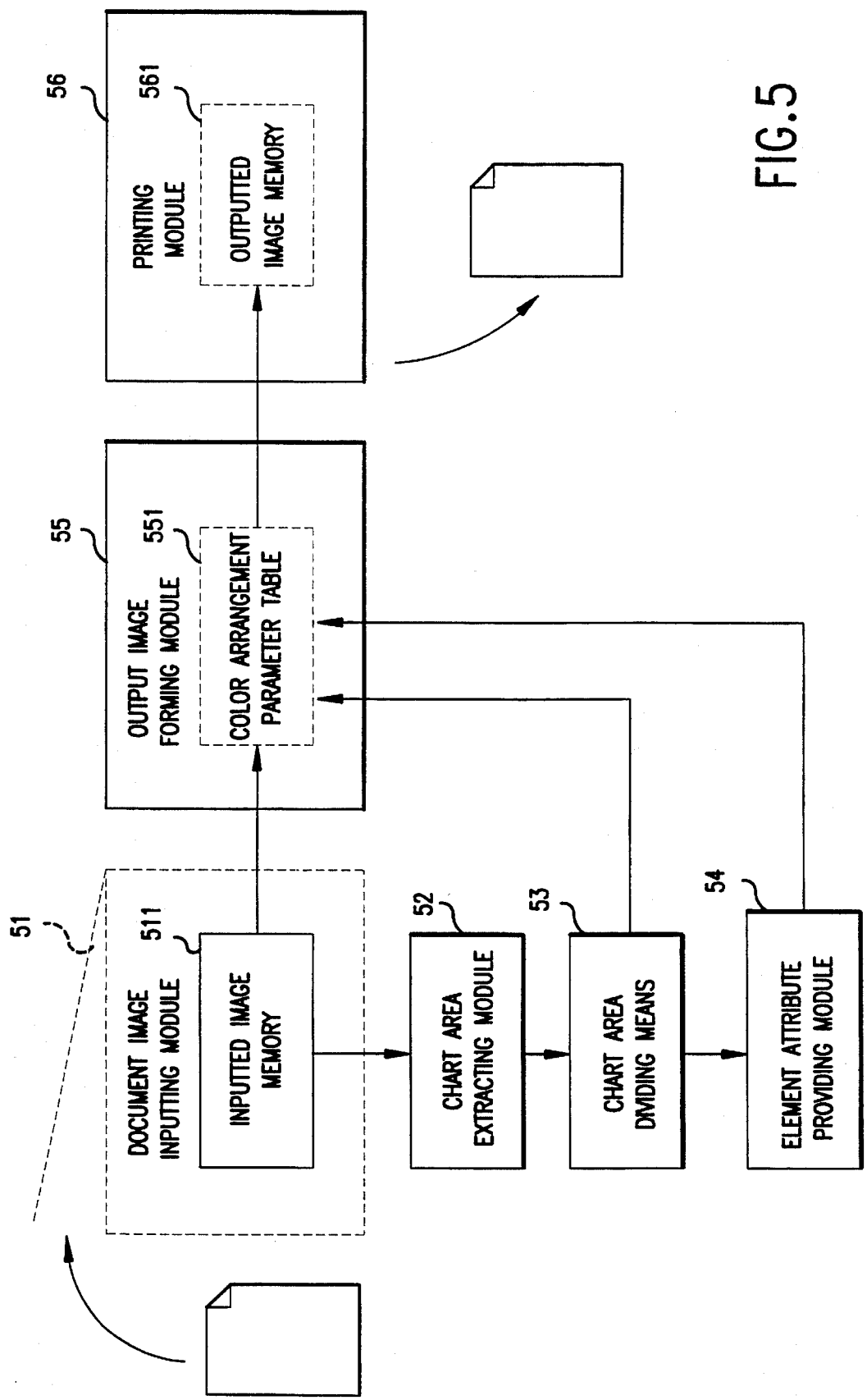
FIG. 5 shows in the document processing device used in a first embodiment which corresponds to one aspect of the present invention.

Embodiments of the present invention are now described, referring to the figures. FIG. 5 shows module included in the document processing device when the document processing device is applied to a copying machine. The device used in this embodiment comprises, as shown in FIG. 5, document image inputting module 51, chart area extracting module 52, chart area dividing module 53, element attribute providing module 54, output image forming module 55 and printing module 56.

Document image inputting module 51 acts just as an image scanner, irradiating a long and narrow area of the first scan direction by a light source while moving in the second scan direction a reading portion comprising the light source and an image sensor, converging the reflected light by a lens, converting the light into electric signals by a device such as a CCD (charge coupled device) image sensor and storing in an inputted image memory the electric signals as digital images of binary values. It is also possible to interpret the optical strength of the reflected light converted into electric signals by means of an analog-digital converter and input the electric signals as images of multi-values and to make them binary-valued by digital image processing.

Chart area extracting module 52 extracts chart areas from images including characters, graphics and other areas that have been inputted as document images. This processing corresponds to area dividing processing of document recognizing art. In area dividing processing, which is realized by the conventional art is shown, for example, in Japanese unexamined patent publication number Sho 64-15889 and Japanese examined patent publication number Sho 61-32712, and here, an inputted image is divided into areas of, for example, character, graphic or table, and the image of an area identified as a chart is outputted. It is possible to carry out pre-treatment such as correcting skew of images, which is caused when reading documents and removing noises, which are included in documents or caused when reading documents.

The image of chart area outputted from chart area extracting module 52 is inputted to chart area dividing module 53, and the chart image is divided into elements such as a character, a line segment and closed areas of an element such as a bar, and thus divided image data are outputted to output image forming module 55. A type and a coordinate value of each element are extracted by chart area dividing module 53 and are outputted to element attribute providing module 54. This processing for recognizing and extracting elements is realized by conventional arts. Recognizing methods for the elements such as a straight line, a rectangle and a circle are established, and further, those for a dotted line, a broken line and a curve are shown in Japanese unexamined patent publications number Hei 4-142679, number Hei 1-173178 and Japanese examined patent publication number Hei 5-739.

Element attribute providing module 54 determines, for each element of the chart structure data outputted from chart area dividing module 53, positional relation with respect to the whole chart (and association with another element regarding characteristics such as color of a document to be outputted, if there is) in accordance with a type and a coordinate value of each element. The element attribute providing module identifies on which part of the chart it will act. Further, it provides such data to the chart structure data as element attributes and it sends the chart structure data with the element attributes to output image forming module 55. This is a chart structure recognizing art, and it is realized by the arts described in, for example, Japanese unexamined patent publications number Hei 4-172574, number Hei 4-324577 and number Hei 5-73685.

Output image forming module 55 receives an inputted image from document image inputting module 51, images of elements from chart area dividing module 53 and chart structure data from element attribute providing module 54. The output image forming module converts, referring to a color arrangement parameter table 551 regarding coloring a chart, characteristics, such as color, of image data corresponding to each element divided by chart area dividing module 53, in accordance with a parameter value corresponding to an element attribute provided to each element. It converts the image data of the portions, which correspond to the coordinate values described in the chart structure data, of the inputted image outputted from document image inputting module 51 into image data formed in output image forming module 55, forms an output image and sends it to printing module 56. Here, the portions other than chart are to be reproduced faithfully to the inputted document.

When coloring inside of a closed area of an element such as a bar, it is possible to convert the image data corresponding to the whole closed area by indicating the coordinates of one point inside of the area, using the conventional art as shown in Japanese unexamined patent publication number Hei 3-18987, and it is also possible to form image data corresponding to a closed area separately and combine it with the inputted image, using the art shown in Japanese unexamined patent publication number Sho 62-65126.

Color arrangement parameter table 551, stored in ROM (Read Only Memory) or the like, shows in what color each element of the chart is colored. The data stored in color arrangement parameter table 551 are selected based on the knowledge necessary for determining document designs, and they are, for example, quantitative data obtained by methods such as subjective evaluation as described in "7Q7 A Study on Evaluation Scales for Document Design Quality", Tsuyoshi TANAKA, Masakazu FUJIMOTO, Tomomi URUSHIBARA, prepared for the 42th Joho Shori Gakkai (Information Processing Society) national symposium, 1991, qualitative or quantitative data as described in "Presentation & Documentation", Fuji Xerox Co., Ltd., 1989, pp.62–87, or "Business document no enshutsu giho II" (Technique for Making Business Documents Look Better II", Fuji Xerox Co., Ltd. and Coa Design Co., Ltd., 1992, pp. 105–123, or data showing the agreement according to corporation rules.

Printing module 56 reads the outputted image in outputted image memory 561, transfers it to a recording medium, using a laser beam printing technique and outputs the medium. In this embodiment, as full color images are outputted, graduation value information of four colors, that is, cyan, magenta, yellow and black, is stored in outputted image memory 561 for each pixel. Here, a laser beam printer capable of full color printing is used. It is also possible to use a marking technique such as thermal transfer to plain papers.
(Operation of the first embodiment)

Figure 6:
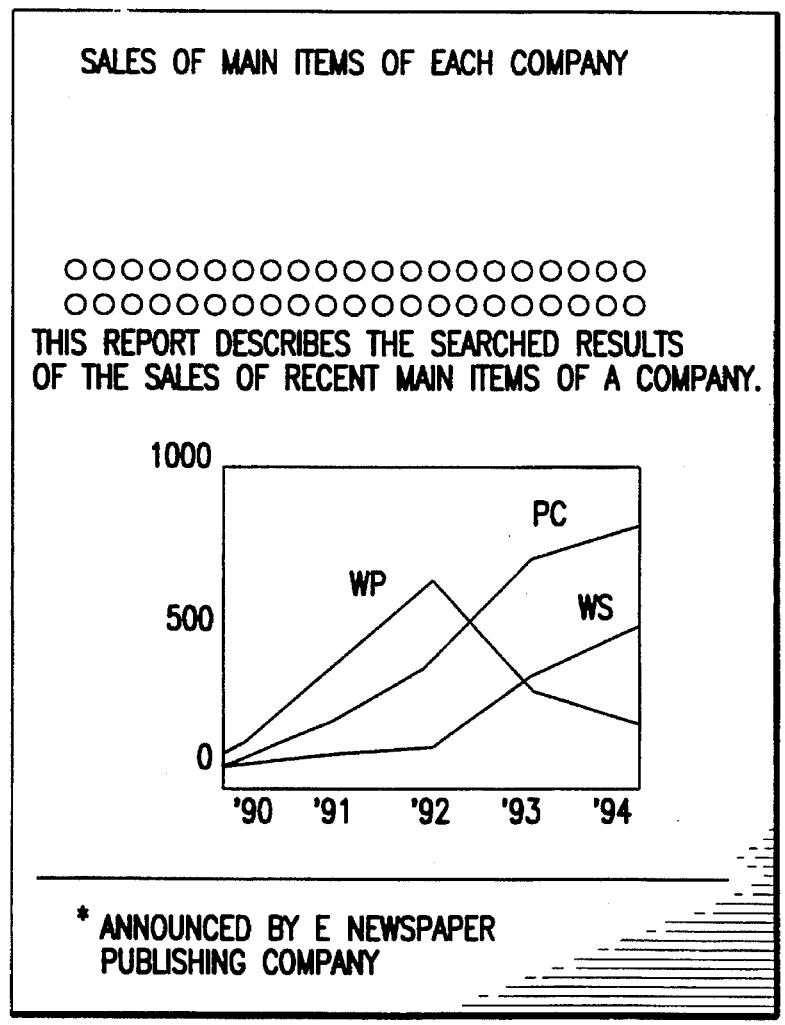
FIG. 6 is an example of an inputted document (a broken line chart)
Figure 7:
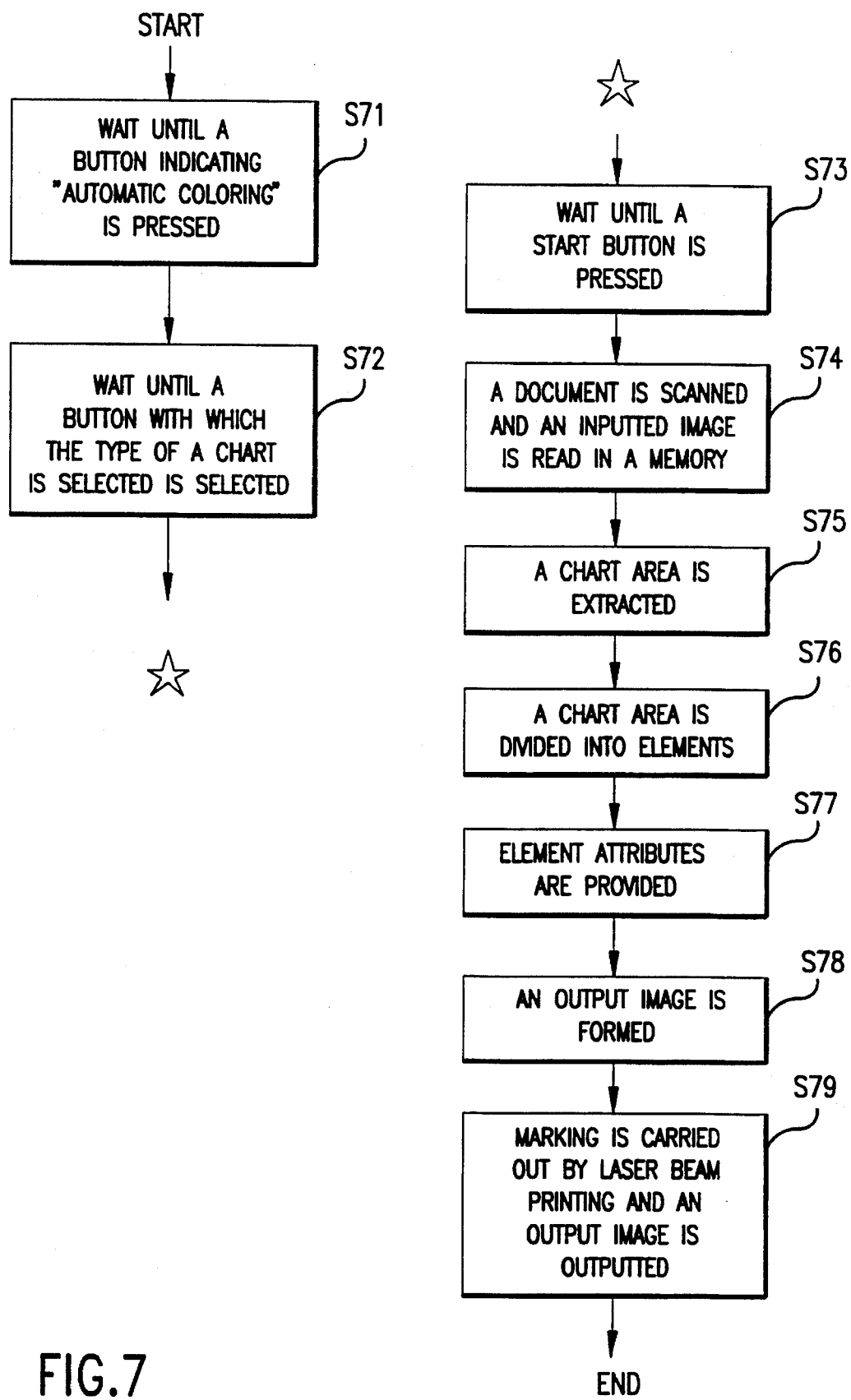
FIG. 7 is a flowchart of the processes carried out in the first embodiment according to the present invention.

Operation of the first embodiment structured as described above is now described, using a document including a chart as shown in FIG. 6 as an example. Here, a broken line chart is colored, and the processing flowchart is shown in FIG. 7. The direction progressing to the right and that progressing below in the page are referred to as x coordinate and y coordinate respectively.

Figure 8A:
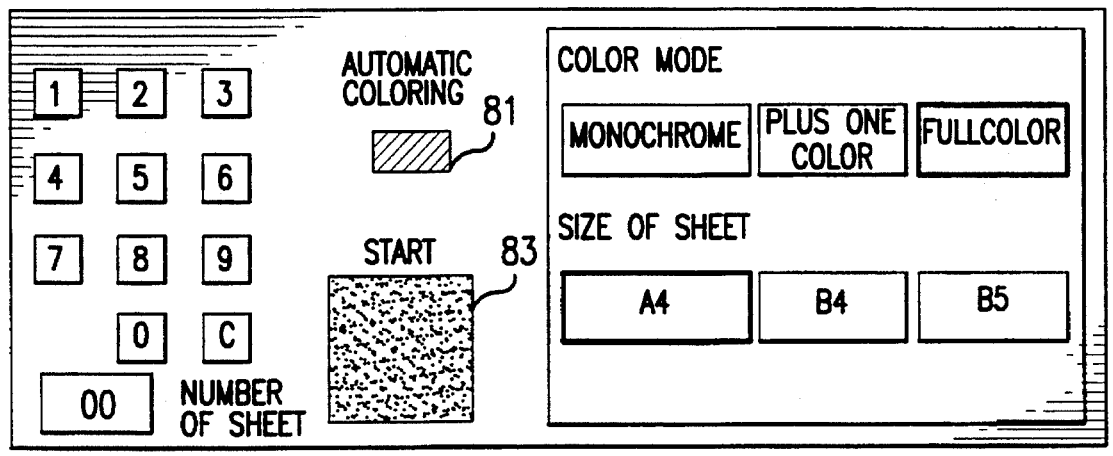
FIG. 8(a) is an operation panel showing the initial window.
Figure 8B:
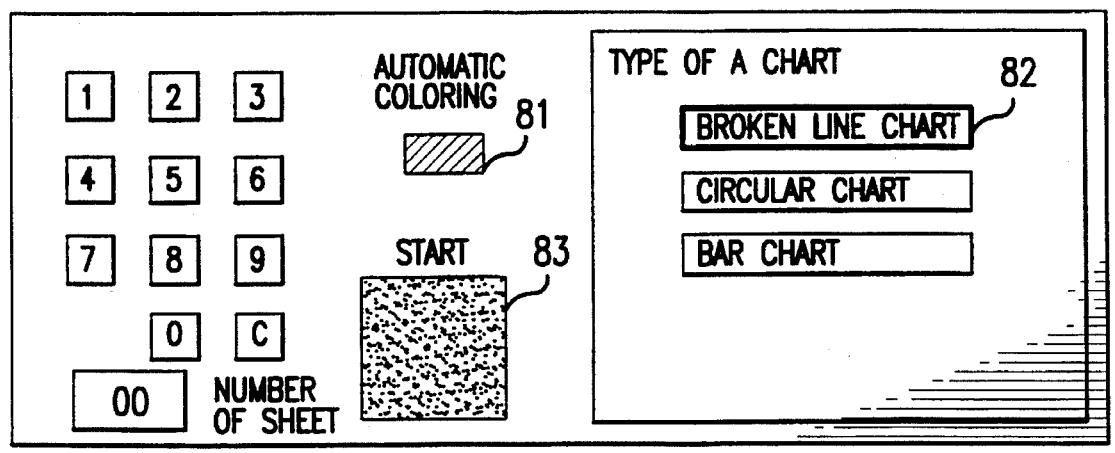
FIG. 8(b) is an operation panel for selecting the type of a chart.

When a user places the document shown in FIG. 6 on a platen included in a device such as an image scanner and selects button 81 of "automatic coloring" on an operation panel as shown in FIG. 8(a) (step 71), a window which shows types of chart to be selected as shown in FIG. 8(b) is displayed. If the user selects, for example, button 82 of "broken line chart" (step 72) and he presses start button 83 with button 82 selected (step 73), document image inputting module 51 starts scanning and stores the document image in an image memory, that is, inputted image memory 511 (step 74).

Figure 10:
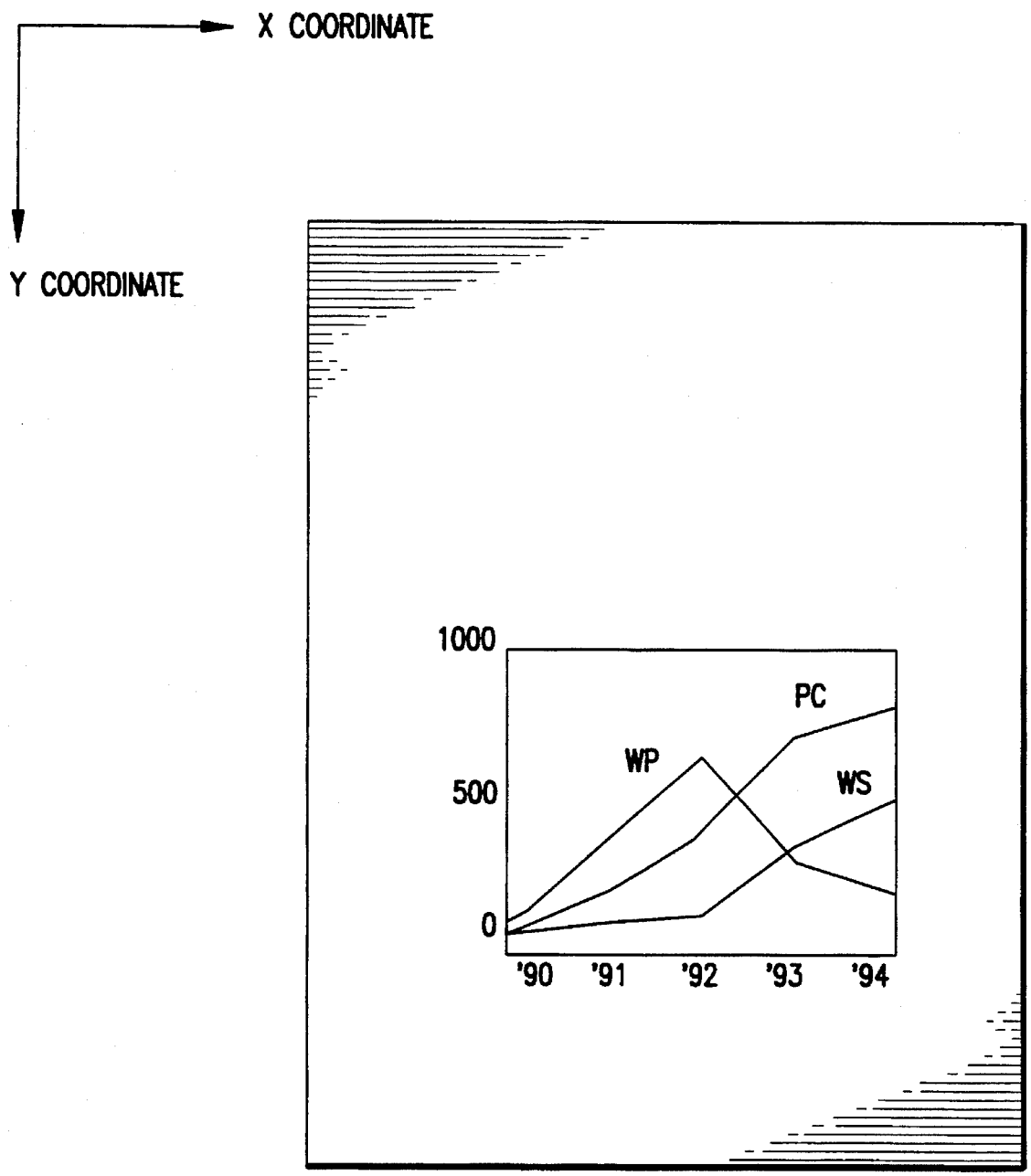
FIG. 10 is an example of a result of the processes carried out by the chart area extracting module used in the first embodiment according to the present invention.

Following this, chart area extracting module carries out processing (step 75), the flowchart of which is shown in FIG. 9. In FIG. 9, the chart area extracting module divides an inputted image into types of area (step 91), extracts the types of area one by one (steps 92 and 93), checks whether each of the extracted types of area is a chart or not (step 94), and if it is, the image of the area is outputted (step 95). If all the areas are checked (step 92), chart area extracting processing is ended, and as a result of this processing, an image of only a chart area is extracted and outputted as shown in FIG. 10.

Figure 11:
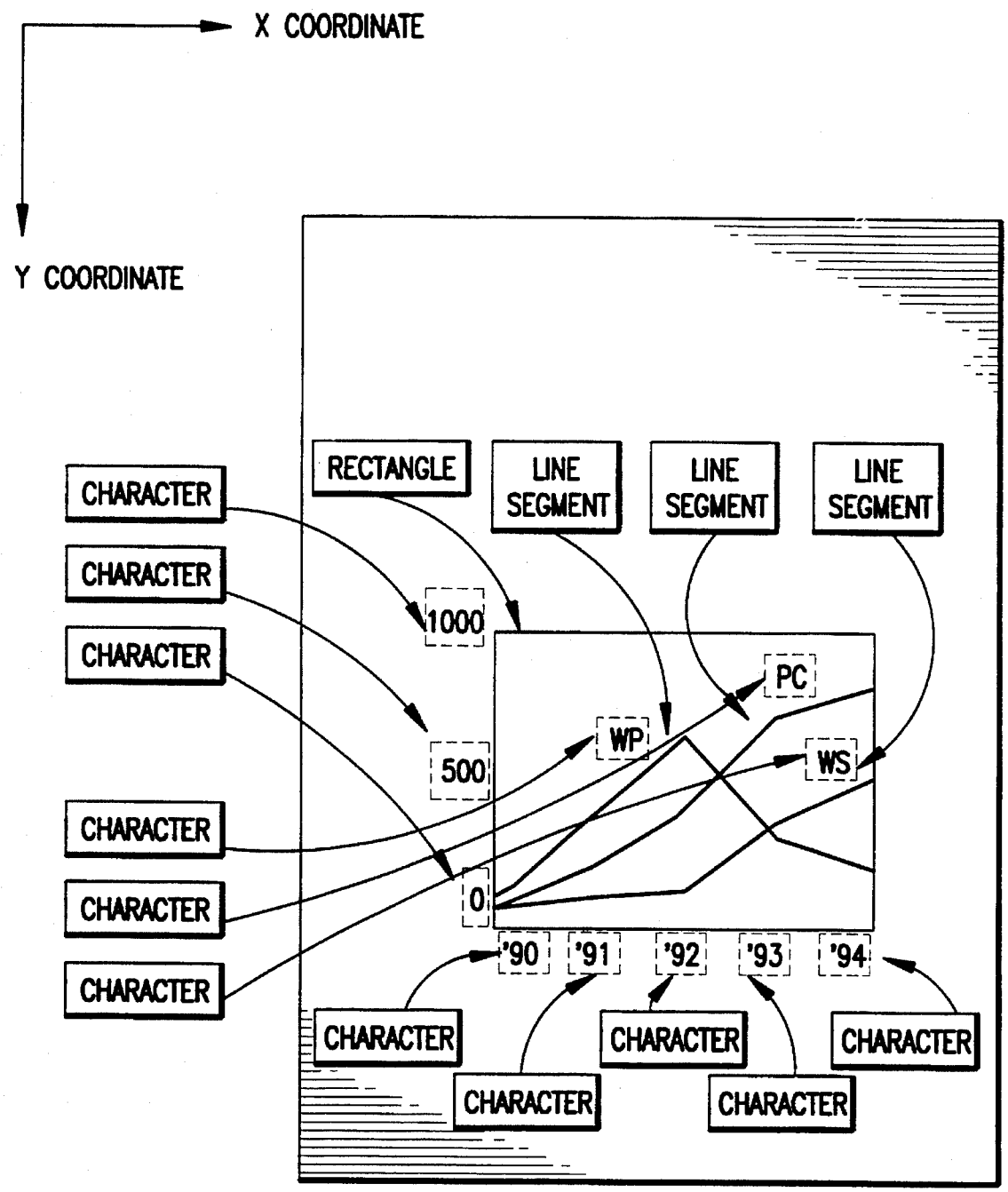
FIG. 11 is an example of elements extracted by the chart area dividing module used in the first embodiment according to the present invention.
Figure 15:
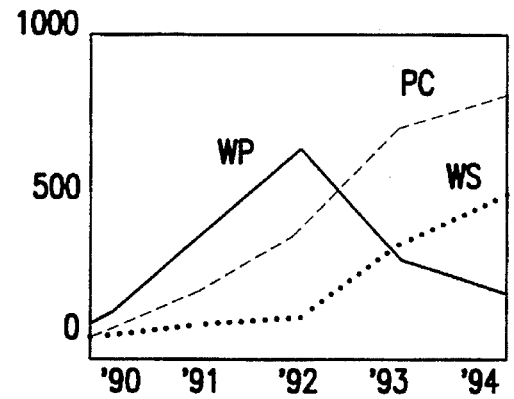
FIG. 15 is an example of an outputted image wherein a broken line chart is colored.

Chart area dividing module 53 then carries out processing with respect to the image of chart area and makes chart structure data (step 76). For example, as shown in FIG. 11, the chart area dividing module checks the type, such as a character block, a line segment or a rectangle, of each element of the chart area and extracts the coordinate values of it. Chart structure data includes, as shown in FIG. 12, numbers of elements, types of elements and coordinate values. Here, a coordinate value is shown by a combination of coordinates, which show the characteristics of the type of an element. For example, the coordinate value of a rectangle is shown by the x and y coordinates of the starting point (upper left point) and those of the ending point (lower right point), the coordinate value of a line segment is shown by the x and y coordinates of the starting point, those of the ending point and those of broken points. As for the coordinate value of a character block, it is shown by the x and y coordinates of a rectangle including the character block inside. An element of a chart is shown not only by a coordinate value but also by other characteristic amounts, for example, in a case of a rectangle, it may be shown by the coordinates of the starting point, height and width.

Element attribute providing module 54 determines, for each element of the chart structure data, positional relation with respect to the whole chart, and it identifies which part of the chart it acts (step 77). It provides such data to the chart structure data as element attributes as shown in FIG. 13, and it sends the chart structure data with the element attributes to output image forming module 55. Here, as the type of the chart is a broken line chart, the largest rectangle and the line segments are regarded as "background" and "broken lines" respectively, and numbers are provided to the broken lines. If an element regarded as a character block is provided below the rectangle (background), an attribute "x graduation" (Here, "graduation" is equivalent to "scale") is provided to it, and if it is in the left (or right) side of the rectangle (background), an attribute "y graduation" is provided to it. Further, if it is close to a line segment (broken line), an attribute "description" is provided to it. Here, "description" is a character string providing a description to a corresponding broken line, and a number which is the same as that of the closest line segment (broken line) is provided to a "description".

Output image forming module 55 receives chart structure data to which element attributes are provided and converts the characteristics, such as color, of the image data corresponding to each element, referring to a color arrangement parameter table, stored in ROM, regarding coloring a broken line chart as shown in FIG. 14. If the element attribute of an element is "broken line 1", the image data of the element is converted such that cyan is 100 percent, magenta is 30 percent, yellow is 20 percent and black is 0 percent. If the element attribute of an element is "broken line 2", the image data of the element is converted such that cyan is 60 percent, magenta is 70 percent, yellow is 0 percent and black is 0 percent. Further, if the element attribute is "background", the image data of the element is converted such that cyan is 20 percent, magenta is 10 percent, yellow is 20 percent and black is 0 percent. Thus, the characteristics, such as color, of image data of elements are converted as indicated by color arrangement parameters corresponding to element attributes (step 78).

The document image of a broken line chart wherein broken lines and descriptions for them are colored individually and the background is colored is transferred to outputted image memory 561 of printing module 56. Thus formed output image is visualized on a recording medium such as a plain paper in accordance with a general full color image outputting process. The image is recorded and displayed as shown in FIG. 14 (step 79).

According to the first embodiment described above, users can make charts colored with the optimum color arrangement by indicating types of chart, even if they do not have knowledge regarding color arrangement, and thus, they can make documents which are legible and visually attractive regarding charts, especially when the documents include charts with many elements.

EMBODIMENT 2

(Structure of the second embodiment)

Figure 16:
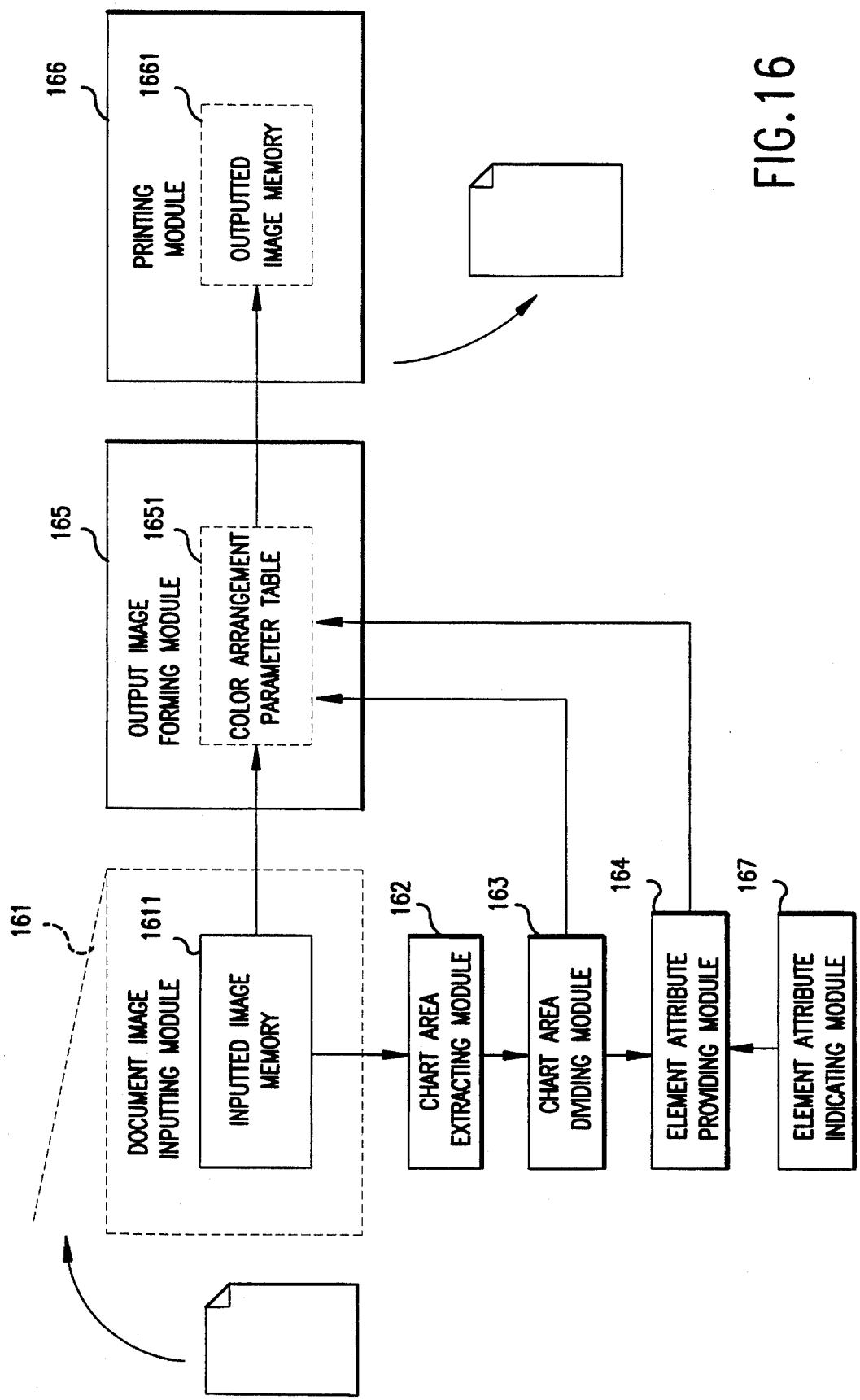
FIG. 16 shows in the document processing device used in a second embodiment which corresponds to another aspect of the present invention.

FIG. 16 shows the structure of the second embodiment according to the present invention applied to a copying machine.

Logical attribute indicating module 167 comprises an editing pad and an edition indicating pen, which are attached to the device and used for indicating afterwards logical meanings such as local emphasis and association which are not shown in inputted monochrome documents. When a user places on the editing pad a document to be colored and indicates by means of the editing pen portions to be emphasized or a portion whose color is to copy that of another portion, the positional coordinates indicated are made to correspond to elements of chart structure data, and the element attributes of the elements in question are changed in accordance with the indicated logical attributes. It is also possible to indicate elements by inputting the numbers of the elements by means of a device such as a ten key attached to the device.

As for other modules, that is, document image inputting module 161, chart area extracting module 162, chart area dividing module 163, element attribute providing module 164, output image forming module 165 and printing module 166, the same modules as used in the first embodiment are used.

(Operation of the second embodiment)

Figure 17:
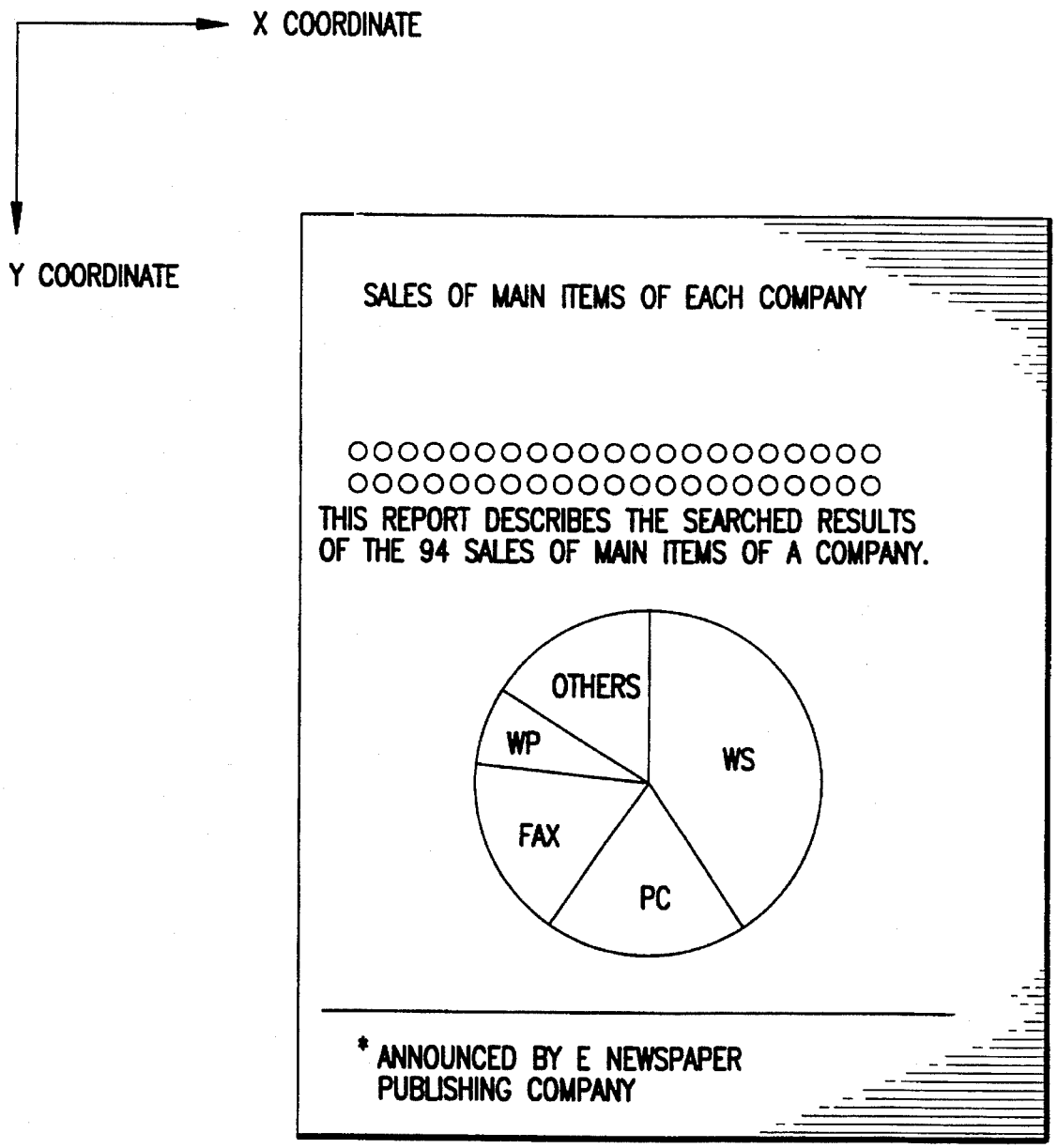
FIG. 17 is an example of an inputted document (a circular chart)
Figure 18:
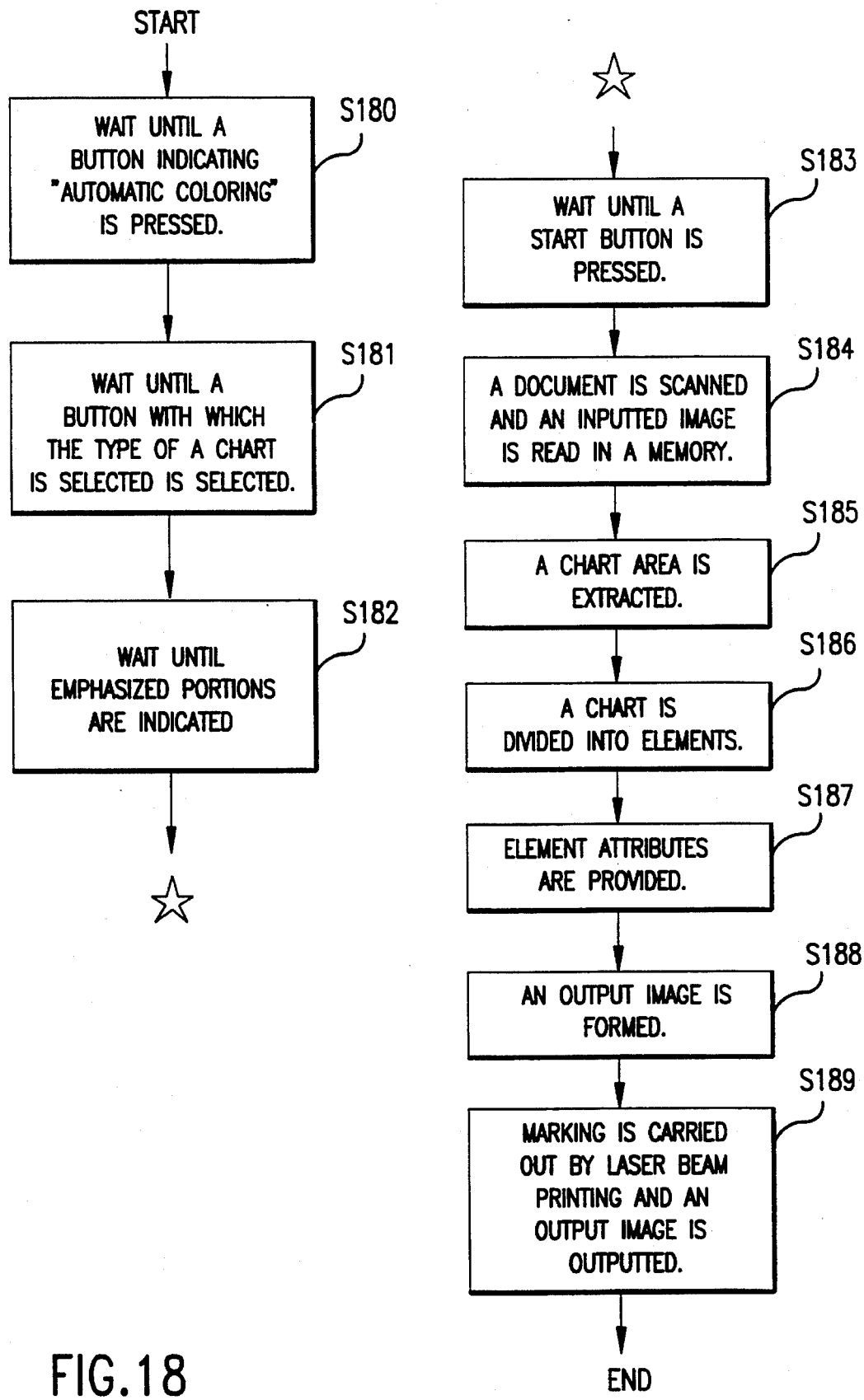
FIG. 18 is a flowchart of the processes carried out in the second embodiment according to the present invention.

Operation of the second embodiment is now described, using as an example the document as shown in FIG. 17 wherein a circular chart is colored. The flowchart of the processes is shown in FIG. 18. As shown in FIG. 17, the direction progressing to the right and that progressing below are hereinafter referred to as x coordinate and y coordinate respectively.

Figure 19:
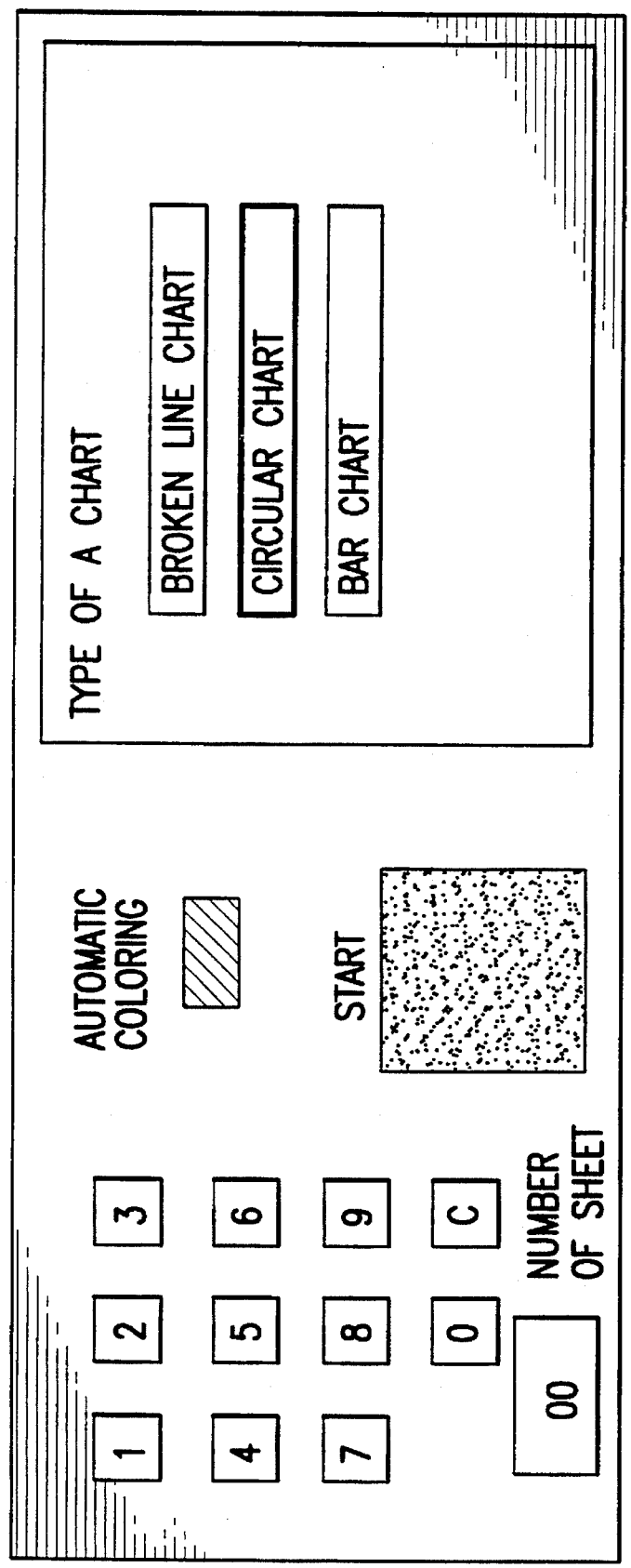
FIG. 19 is an operation panel for selecting the type of a chart.

When a user places the document shown in FIG. 17 on a platen included in an image scanner and selects, for example, "automatic coloring" on an operation panel as shown in FIG. 8(*a*) (step 180), a window with which the type of a chart is selected as shown in FIG. 19 is displayed on the panel. Here, if he selects "circular chart" (step 181) and the start button is pressed with "circular chart" selected (step 183), document image inputting module 161 starts scanning, and it stores the document image in image memory 1611, which is an inputted image memory (step 184).

Figure 20:
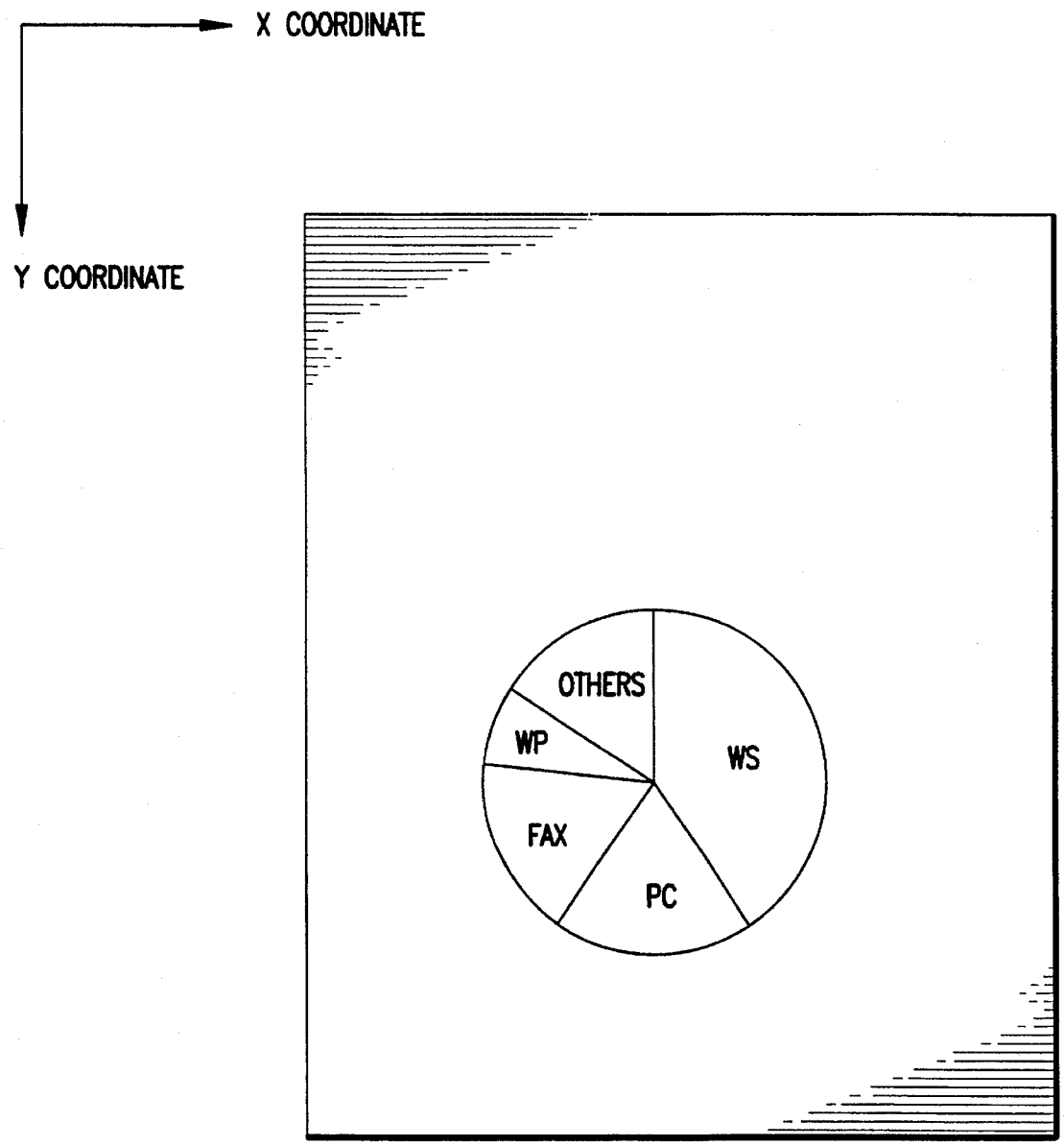
FIG. 20 is an example of a result of the processes carried out by the chart area extracting module used in the second embodiment according to the present invention.

Following this, chart area extracting module 162 carries out processing (step 185), the flowchart of which is shown in FIG. 9, and it is the same as described in the first embodiment. As the result of the processing, an image of only the chart area is extracted and outputted as shown in FIG. 20.

Figure 21:
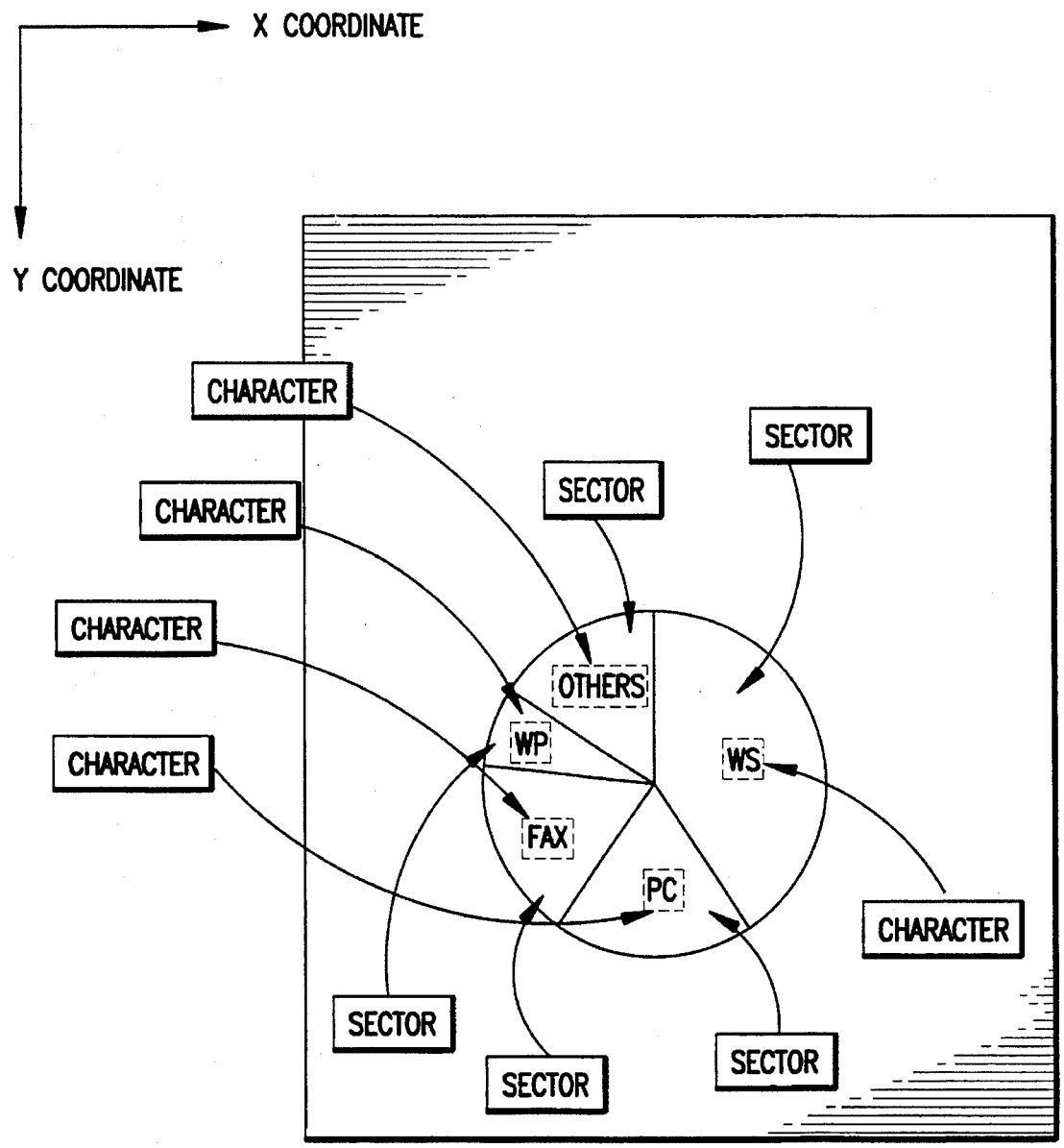
FIG. 21 is an example of elements extracted by the chart area dividing module used in the second embodiment according to the present invention.

Chart area dividing module 163 then carries out processing with respect to the chart area and forms chart structure data (step 186). For example, as shown in FIG. 21, it checks whether the type of each element is a character block, a sector or the like, and extracts the coordinate value of each element. As shown in FIG. 22, chart structure data includes numbers of elements, types of elements and coordinate values. Here, a coordinate value is shown by a combination of coordinates of points, which show the characteristics of the type of an element. For example, here, the coordinate value of a sector includes x and y coordinates of the center point of the sector with respect to the arc and those of both end points of the arc. As for a character block, x and y coordinates of a rectangle including and bounding it are used. It is also possible to express an element by characteristic amounts other than a coordinate value, and for example, a combination of x and y coordinates of the center point, those of one end point of the sector and the center angle is used with respect to a sector.

Element attribute providing module 164 determines, for each element of the chart structure data, positional relation with respect to the whole chart in accordance with a type and a coordinate value of each element and identifies on which part of the chart it acts. As shown in FIG. 23, it provides such data to the chart structure data as element attributes and sends the chart structure data with the element attributes to output image forming module 165 (step 187). Here, as the type of the chart is a circular chart, numbers are provided to the sectors in the clockwise direction from the top. A character block is regarded as a "description", and the number which is the same as that provided to the closest sector is provided to it. Here, "description" is a character string which adds description to a corresponding sector.

Figure 24:
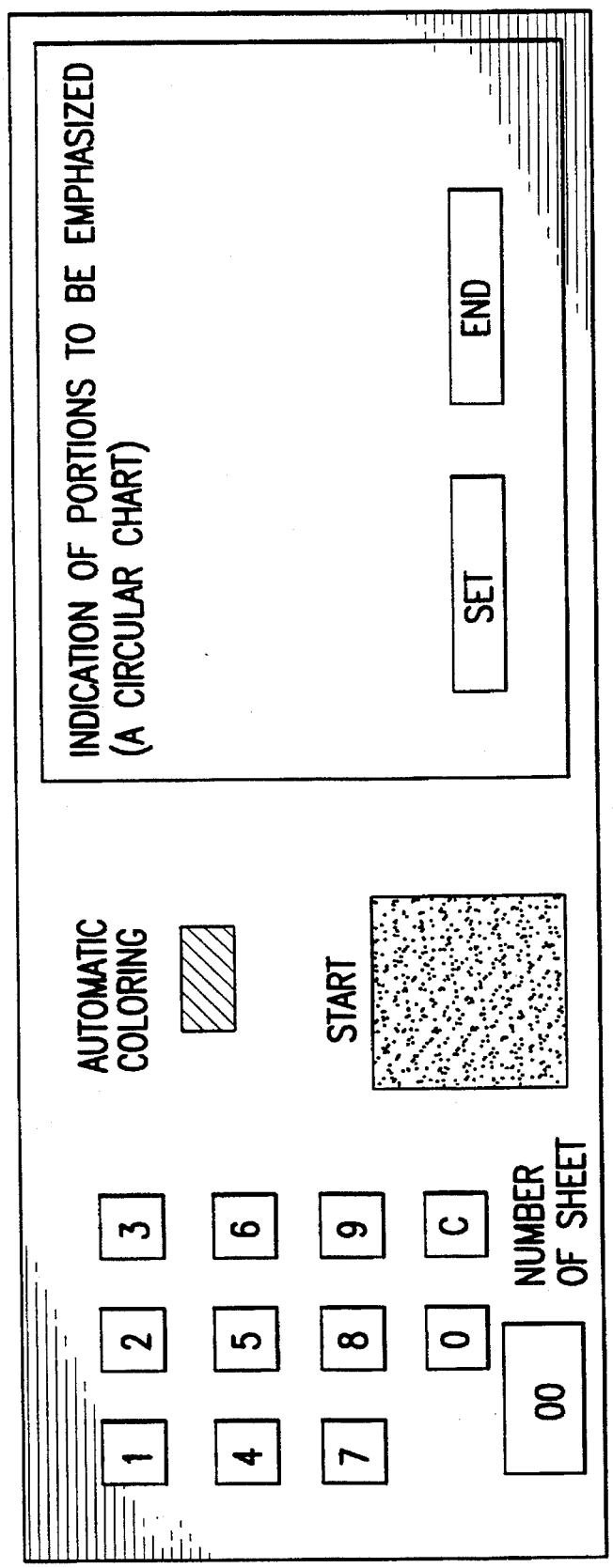
FIG. 24 is an operation panel for selecting the portions, which are to be emphasized, of a circular chart.

On the other hand, logical attribute indicating module 167 displays a panel as shown in FIG. 24 so that the user can indicate logical attributes (step 182). Here, a case wherein a part of the sectors in a circle is emphasized is described as an example. When the user indicates the position of a sector to be emphasized, the indicated coordinate value is, after being identified, compared with a coordinate value of each element of the chart structure data, and it is determined in which sector the indicated coordinate value is included. The element attribute of the sector in question is then changed. For example, if a point whose x coordinate is 120.0 and y coordinate is 180.0 is indicated on the editing pad, as it is a point inside of "sector 1", "sector 1" is regarded to be indicated as shown in FIG. 25, and the logical attribute of "sector 1" is changed into "sector (emphasized)". In addition to local emphasis, it is possible to carry out association among elements such as copying the color of another element.

Figure 27:
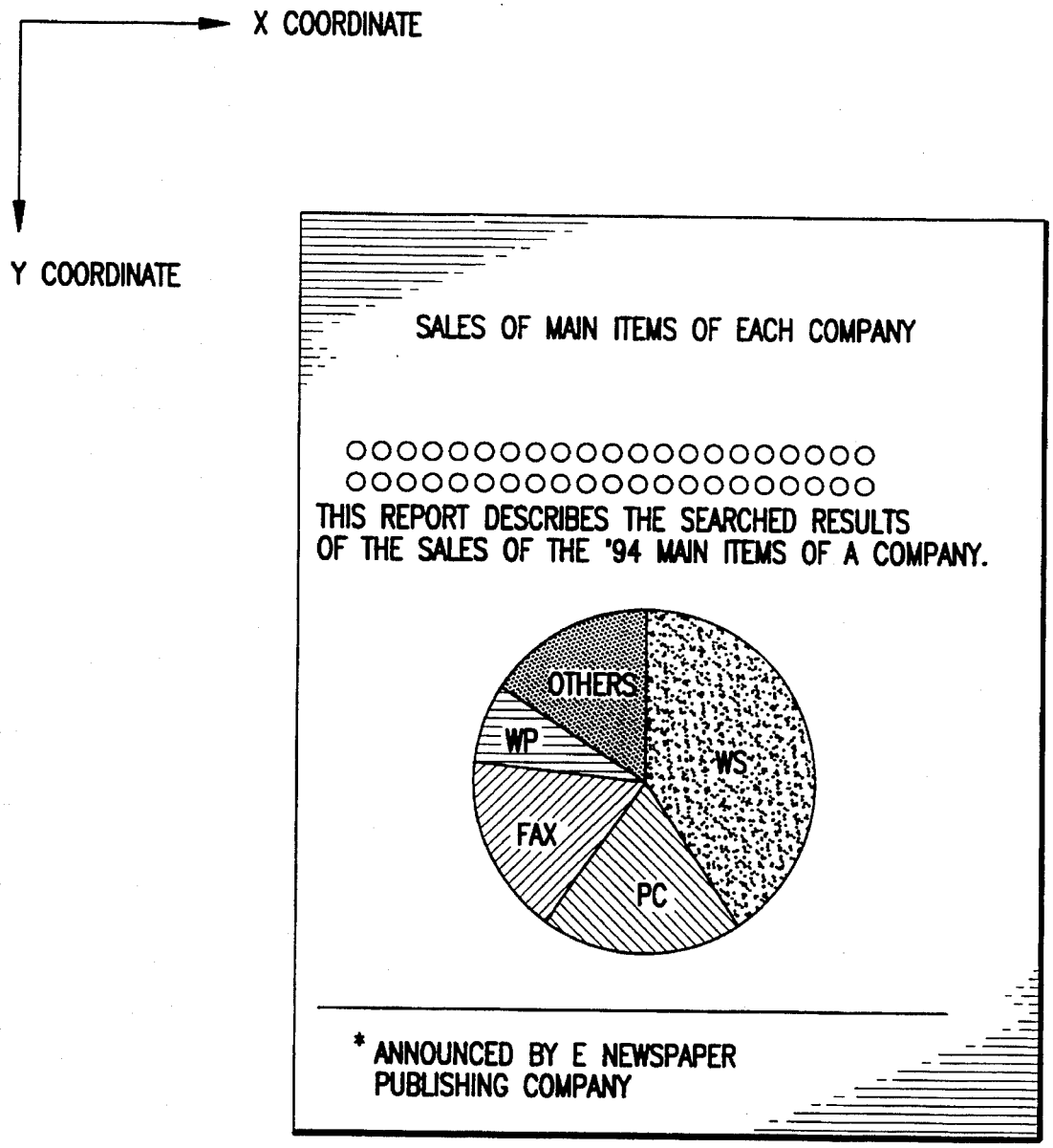
FIG. 27 shows an example of an outputted image wherein a circular chart is colored.
Figure 28:
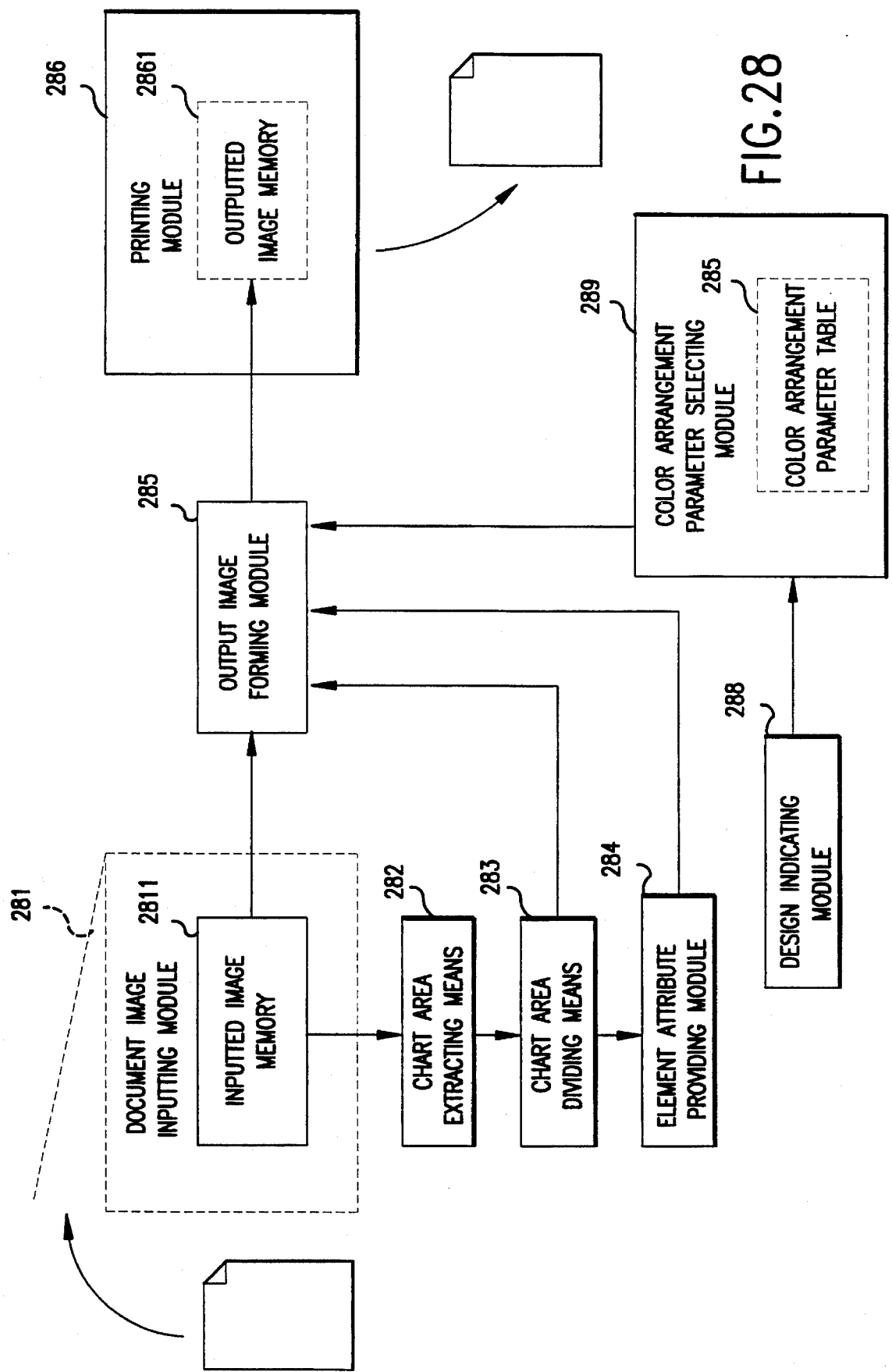
FIG. 28 shows in the document processing device used in a third embodiment which corresponds to another aspect of the present invention.

Output image forming module 165 receives chart structure data to which element attributes are provided and converts characteristics, such as color, of image data corresponding to each element, referring to a color arrangement parameter, stored in ROM, regarding coloring a circular chart as shown in FIG. 26. If the element attribute of an element is "sector (emphasized)", the image data of the element is converted such that cyan is 50 percent, magenta is 60 percent, yellow is 10 percent and black is 0 percent, and if the element attribute of an element is "sector 2", the image data of the element is converted such that cyan is 45 percent, magenta is 15 percent, yellow is 15 percent and black is 0 percent. Thus, image data of elements are converted as indicated by color arrangement parameters corresponding to the element attributes. A document image including a circular chart wherein sectors and descriptions for them are colored individually and indicated portions are emphasized is transferred to outputted image memory 1661 of printing module 166. The formed output image is visualized on a recording medium such as a plain paper in accordance with a general full color image outputting process, recorded and displayed as shown in FIG. 27. According to the second embodiment described above, users can make charts wherein indicated portions are emphasized or associated with the optimum color arrangement by simple indications of types of chart and portions to be emphasized or associated, even if they do not have knowledge of color arrangement. With this system, it is possible to make visually attractive documents, such as charts, satisfying the intended purpose of the user.

Embodiment 3

(Structure of the third embodiment)

The structure of the third embodiment according to the present invention is applied to a copying machine is shown in FIG. 8.

Design indicating module 287 comprises devices such as a touch input type display, which is provided on an operation panel of the device, and which also acts as a display portion showing selection buttons and operation steps. It the design indicating module displays designs corresponding to the selected type of chart so that a user can select designs in accordance with his intentions. If buttons are pressed, it sends the data corresponding to the indication to color arrangement parameter selecting module 289. (Here, a plurality of buttons can be selected.)

Color arrangement parameter selecting module 289 sends, from among a plurality of color arrangement tables 2891 stored in advance, a parameter table corresponding to the intentions of the user to output image forming module 285. If the indication from design indicating module 288 is a combination of a plurality of indications, the optimum parameter table for the combination is outputted. Parameter tables are stored in a ROM, being classified in accordance with elements such as size of recording media to be outputted and contents of design indications. If the space occupied by the parameter tables is too large, The tables can be stored in devices such as a magnetic disc. Data held by parameter tables are determined as described in embodiment 1.

As for other modules, that is, document image inputting module 281, chart area extracting module 282, chart area dividing module 283, element attribute providing module 284, output image forming module 285 and printing module 286, the same modules as used in the first embodiment are used.

(Operation of the third embodiment)

Figure 29:
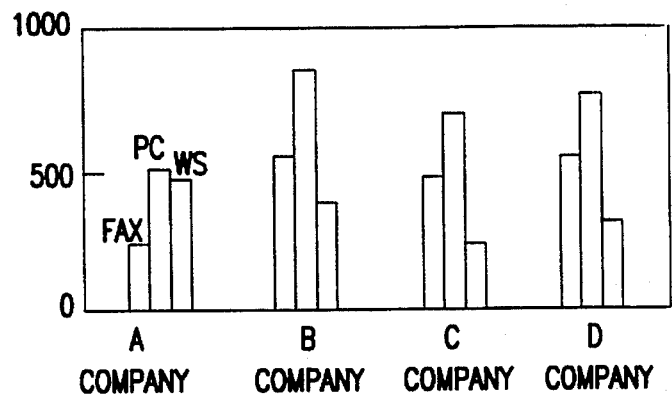
FIG. 29 shows an example of an inputted document (a bar chart)
Figure 30:
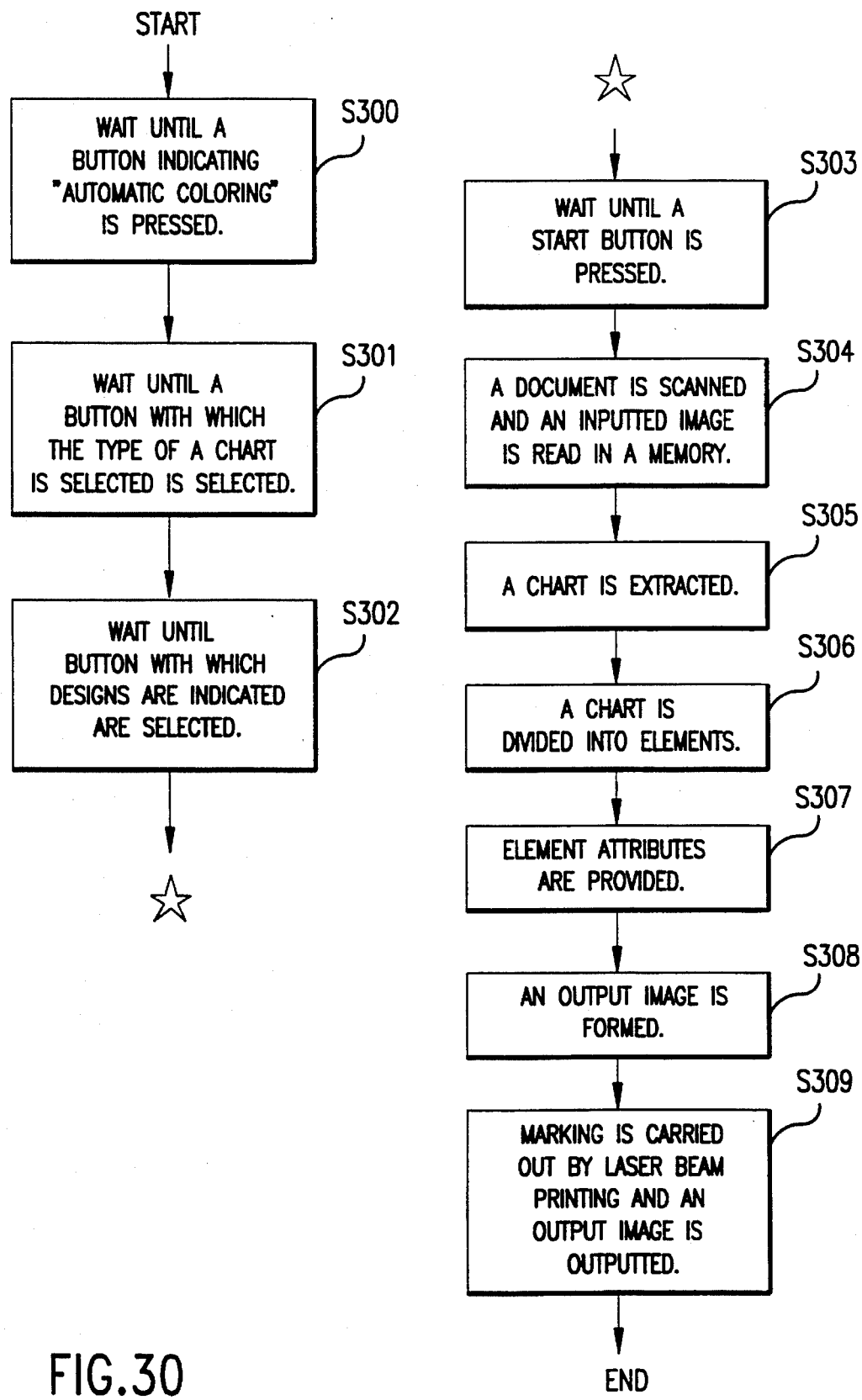
FIG. 30 is a flow chart of the processes carried out in the third embodiment according to the present invention.

The operation of the third embodiment is now described, using as an example a document as shown in FIG. 29 wherein a bar chart is colored. The flowchart of the processes is shown in FIG. 30. The direction progressing in the right and that progressing below are hereinafter referred to as x coordinate and y coordinate respectively.

Figure 31A:
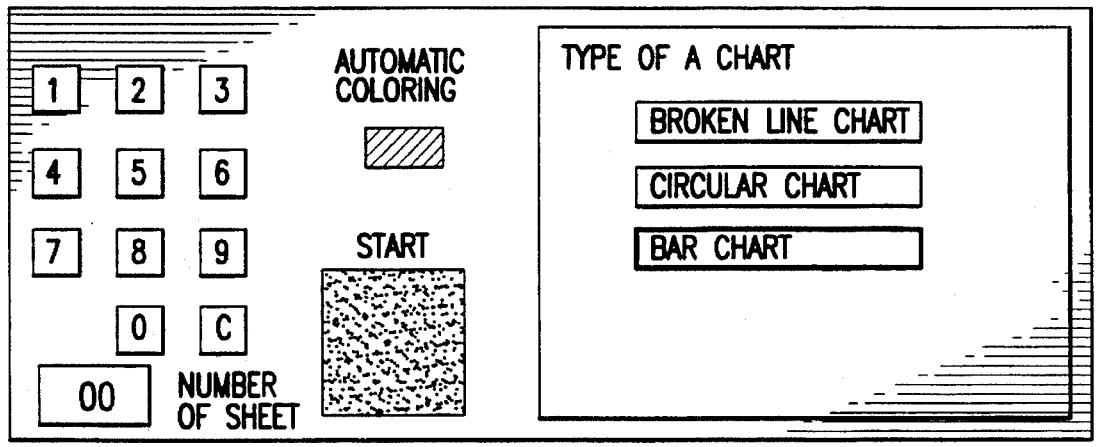
FIG. 31(a) is an operation panel for selecting the type of a chart.

When a user places the document shown in FIG. 29 on a platen included in a device such as an image scanner and selects "automatic coloring" on an operation panel as shown in FIG. 8(a), a window with which the type of a chart is selected as shown in FIG. 31(a) is displayed on the panel. If he selects "bar chart" and the start button is pressed with "bar chart" selected, document image inputting module 281 starts scanning, and it stores the document image in image memory 2811 which is an inputted image memory.

Following these procedures, chart area extracting module 282 carries out processing, in accordance with the flowchart shown in FIG. 9 as described in the first embodiment. As a result, an image of only the chart area is extracted and outputted.

Figure 33:
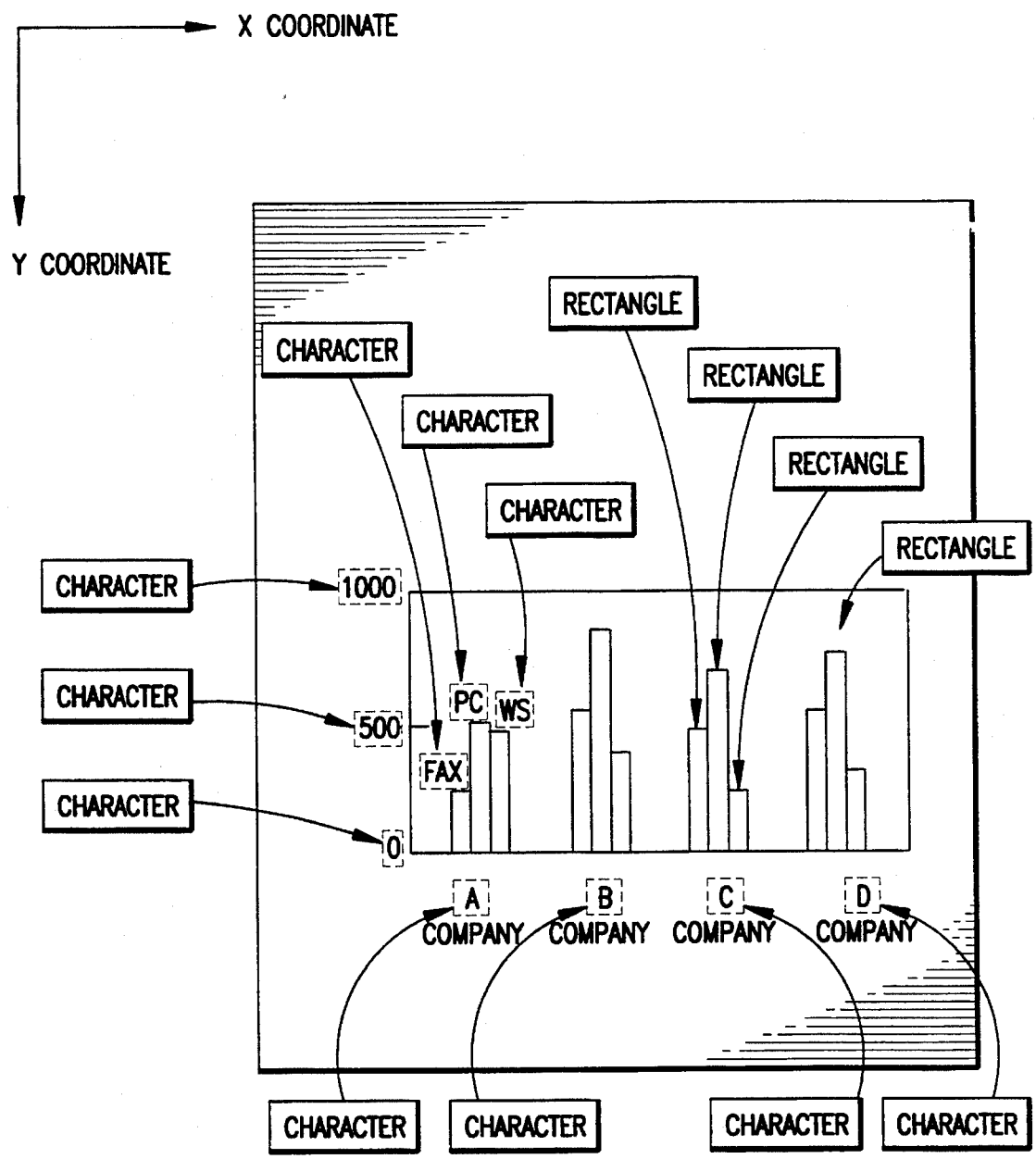
FIG. 33 shows an example of elements extracted by the chart area dividing module used in the third embodiment.

Chart area dividing module 283 then carries out processing with respect to this chart area and forms chart structure data. For example, as shown in FIG. 33, it checks whether the type of each element of the chart is a character block, a rectangle or another type and extracts the coordinate value of each element. Chart structure data comprises, as shown in FIG. 34, numbers of elements, types of elements and coordinate values, and a coordinate value is shown by a combination of coordinates of points that show the characteristics of the type of an element. For example, here, a rectangle is shown by the x and y coordinates of the starting point (upper left point) and those of the ending point (lower right point), and a character block is shown by the x and y coordinates of a rectangle including and bounding it. It is also possible, for example, with respect to a rectangle, to show an element not only by its coordinate value but also by other characteristic amounts such as a combination of the coordinates of the starting point, height and width.

Element attribute providing module 284 determines, for each element of the chart structure data, positional relation with respect to the whole chart in accordance with a type and a coordinate value of each element, and it identifies, considering the type of the chart, on which part of the chart it acts. As shown in FIG. 35, element attribute providing module 284 sends such data to the chart structure data as element attributes, and it sends the chart structure data with the element attributes to output image forming module 285. Here, as the type of the chart is a "bar chart", the largest rectangle is regarded as "background" and other rectangles are regarded as "bars". Further, grouping is carried out based on the distance between each bar number are provided group by group to each bar from the left. Coloring individually group by group or bar by bar in each group is also possible by providing each group with a group number or providing each bar with both of a group number and a number provided to it in its group. As for character blocks, if a character block is below the rectangle of background, its attribute is regarded as "x if it is in the left (or right) side with respect to the rectangle of background, the attribute of it is regarded as "y graduation", and further, if it is close to a rectangle of a bar, the attribute of it is regarded as "description". Here, "description" is a character string providing a description to a corresponding bar, and a number which is the same as that of the closest bar is provided to a "description".

Figure 31B:
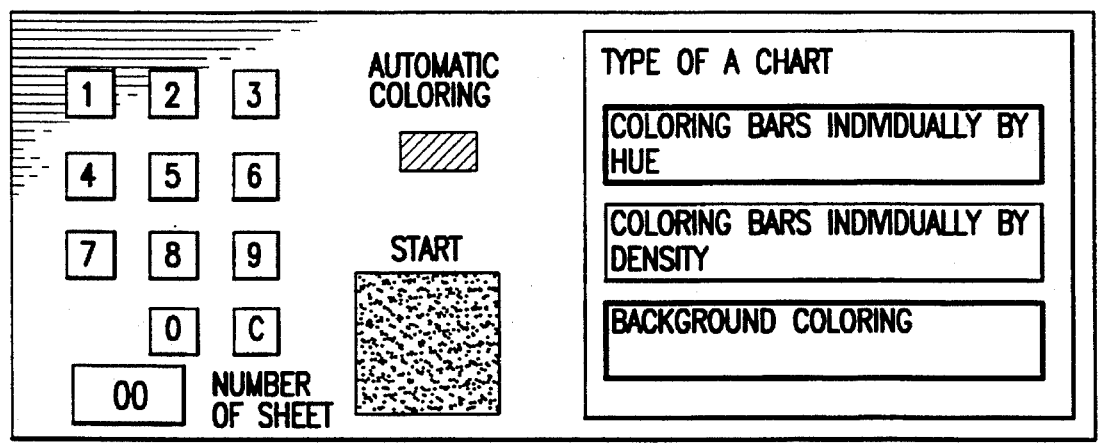
FIG. 31(b) is an operation panel for indicating designs.
Figure 32:
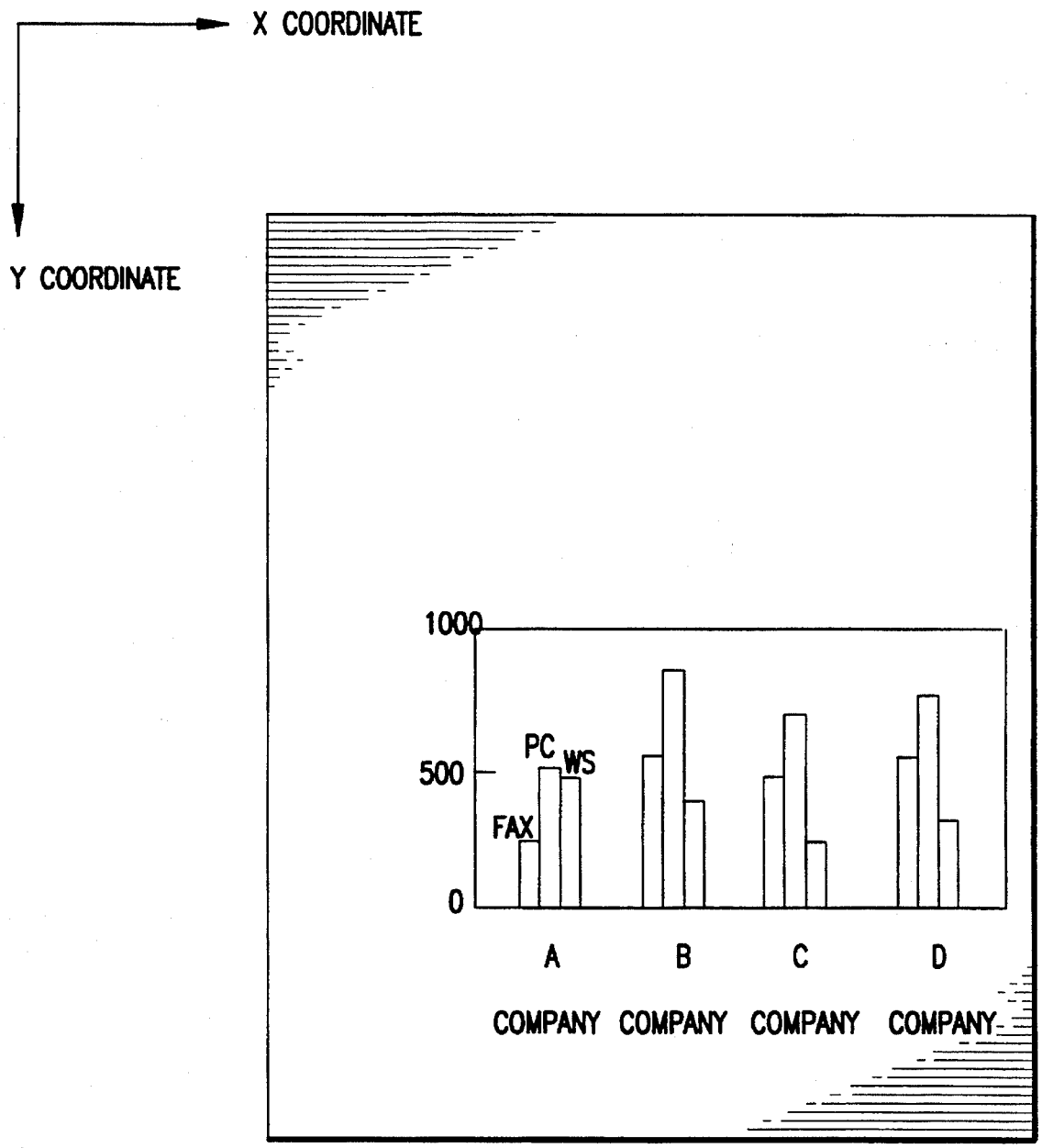
FIG. 32 shows an example of a result processed by the chart area extracting module used in the third embodiment according to the present invention.

Design indicating module 287 displays selection buttons as shown in FIG. 31(b) so that the user can select designs among a plurality of designs. If he selects "coloring bars individually by hue" and "background coloring", the information is sent to color arrangement parameter selecting module 288.

Color arrangement parameter selecting module 288 selects a color arrangement parameter table as shown in FIG. 36. The selection corresponds to the selected designs from among a plurality of color arrangement parameter tables 2881 stored in the ROM in advance. The selection is made in accordance with the information outputted from design indicating module 287 and sent to output image forming module 285.

Output image forming module 285 receives chart structure data to which element attributes are provided and converts, referring to a color arrangement parameter table regarding coloring a bar chart outputted from color arrangement parameter selecting module 288, image data of elements as indicated by color arrangement parameters corresponding to the element attributes. If the element attribute of an element is "bar 1", the image data of the element is converted such that cyan is 45 percent, magenta is 15 percent, yellow is 15 percent and black is 0 percent. If the element attribute of an element is "bar 2", the image data of the element is converted such that cyan is 45 percent, magenta is 45 percent, yellow is 15 percent and black is 0 percent, and further, if the element attribute is "background", the image data of the element is converted such that cyan is 20 percent, magenta is 10 percent, yellow is 20 percent and black is 0 percent.

A document image of a bar chart wherein bars and descriptions for them are colored individually by hue and the background is colored is transferred to output image memory 2561 of printing module 286, and the thus formed output image is visualized on a recording medium such as a plain paper in accordance with a general full color image outputting process, recorded and displayed as shown in FIG. 37. According to the third embodiment, the user can make charts colored with the optimum color arrangement by indicating the type of chart and selecting designs, even if he does not have knowledge of designing and color arrangement, and he can make colorful documents, such as charts, that are visually attractive and satisfy his intended purposes.

Embodiment 4

(Structure of the fourth embodiment)

Figure 38:
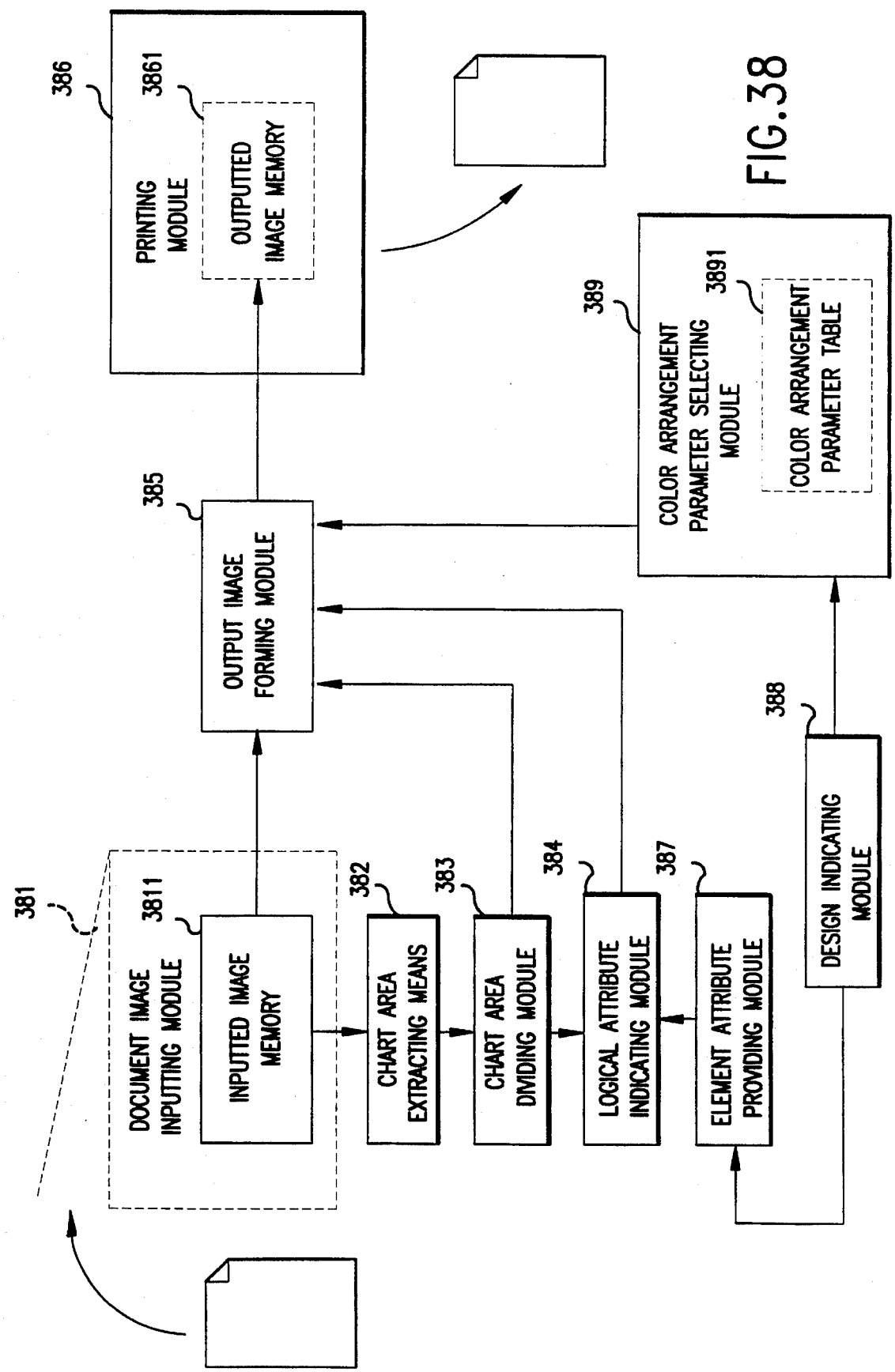
FIG. 38 shows in the document processing device used in a fourth embodiment which corresponds to another aspect of the present invention.

FIG. 38 shows an example applied to a copying machine. This embodiment corresponds to a combination of the second and the third embodiments, that is, the logical attribute indicating module described in the second embodiment is added to the third embodiment.

Logical attribute indicating module 387 comprises an editing pad and an edition indicating pen, which are attached to the device and used for indicating afterwards logical meanings such as local emphasis and association which are not shown in inputted monochrome documents. When a user places a document to be colored on the editing pad and indicates the portions to be emphasized or the portion whose color is to copy that of another portion, the positional coordinates indicated here are made to correspond to elements of chart structure data, and the element attributes of the elements in question are changed in accordance with the indicated logical attributes. It is also possible to indicate elements by inputting the numbers of elements by means of a device such as ten key attached to the device. As for other modules, the same modules as used in the third embodiment are used.

(Operation of the fourth embodiment)

Figure 39:
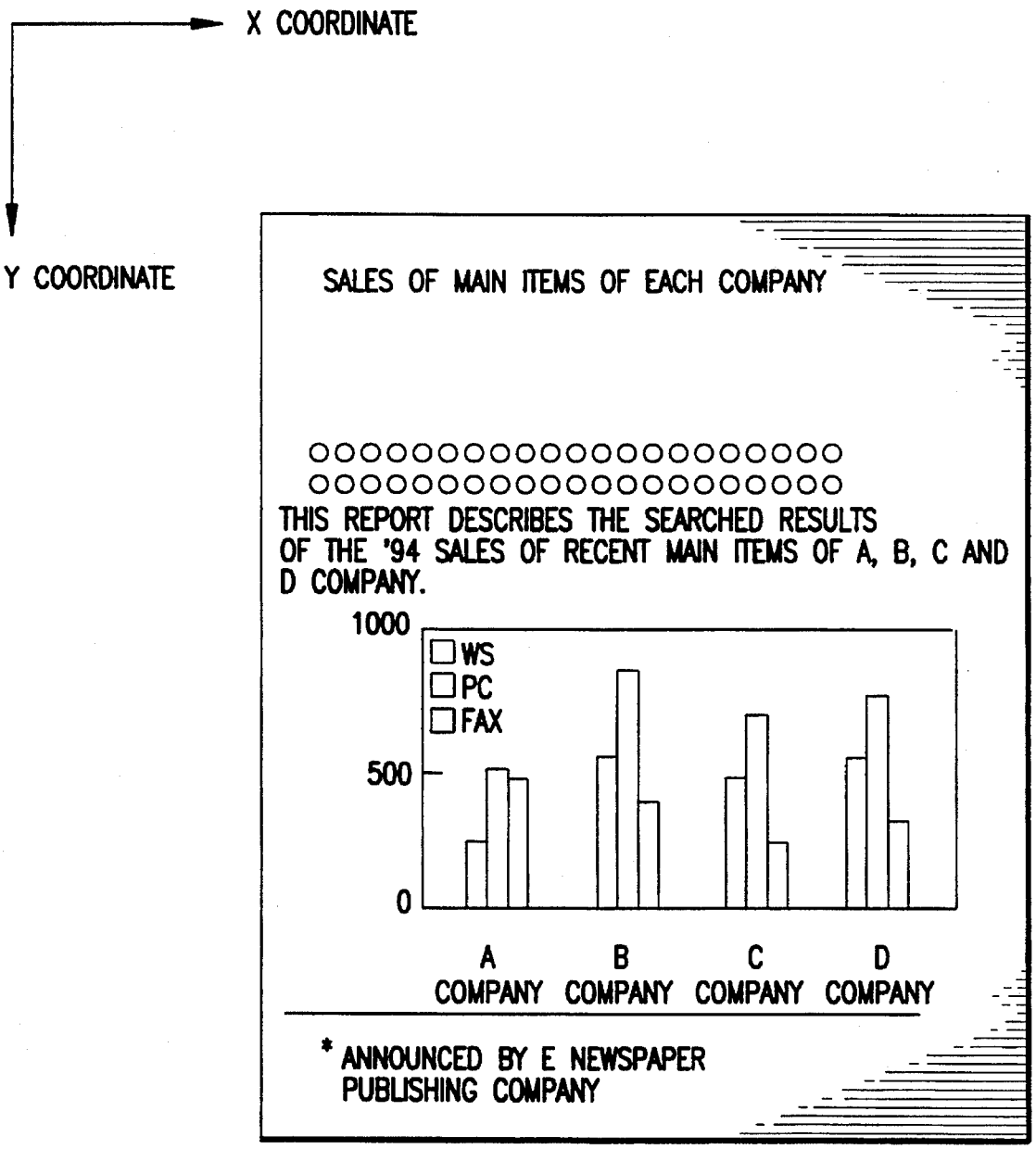
FIG. 39 shows an example of an inputted document (a bar chart)
Figure 40:
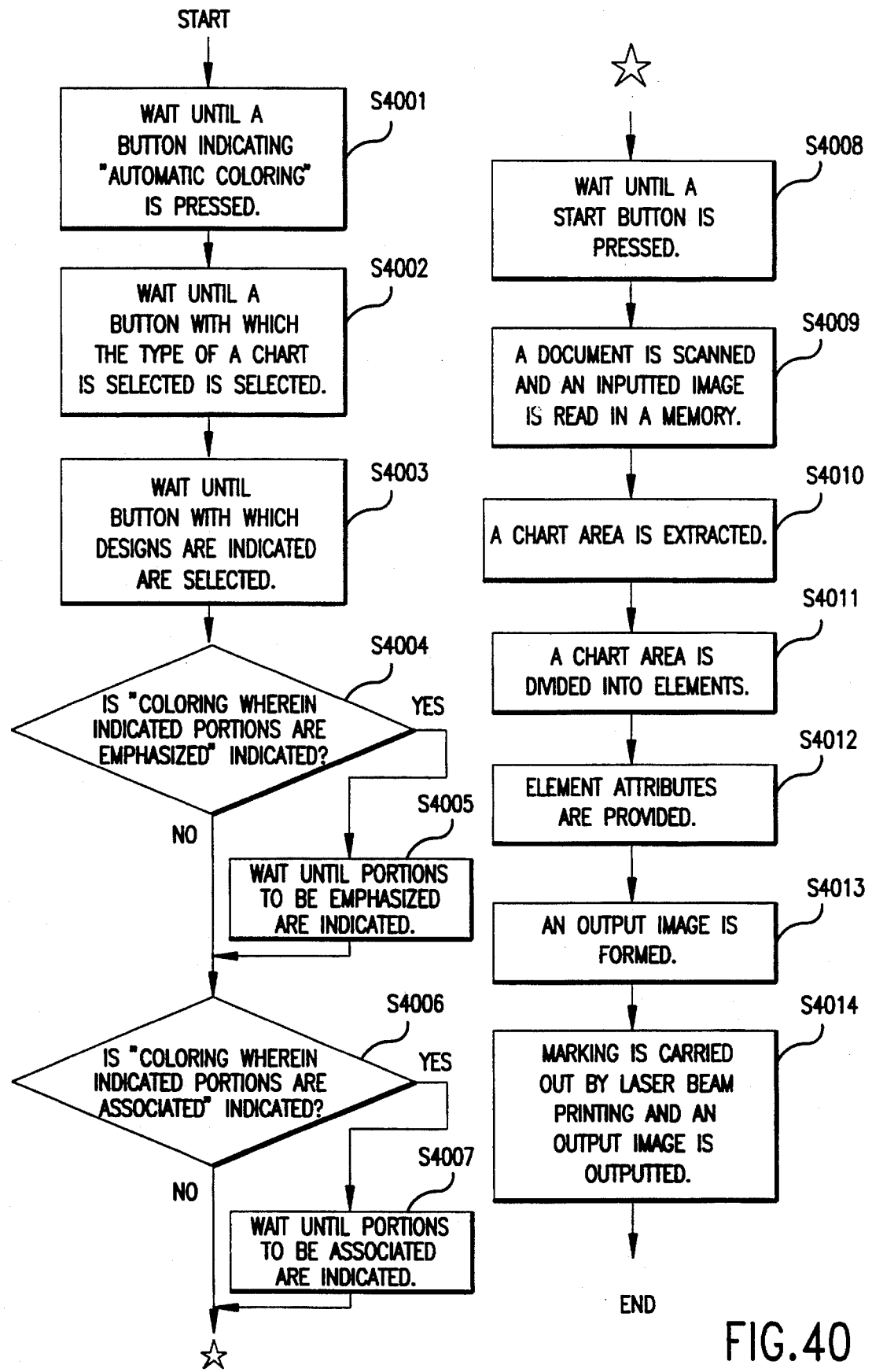
FIG. 40 is a flowchart of the processes carried out in the fourth embodiment according to the present invention.

The operation of the fourth embodiment is now described, using as an example a document as shown in FIG. 39 wherein a bar chart is colored, and the flowchart of the processes is shown in FIG. 40. The direction progressing in the right and that progressing below are hereinafter referred to as x coordinate and y coordinate respectively as shown in FIG. 39.

When a user places the document shown in FIG. 39 on a platen included in an image scanner and selects "automatic coloring" on an operation panel as shown in FIG. 8(a) (step 4001), a window with which the type of chart is selected as shown in FIG. 31(a) is displayed on the panel. If he selects, for example, "bar chart" (step 4002) and start button 83 is pressed with "bar chart" selected (step 4008), document image inputting module 381 starts scanning and it stores the document image in an image memory, which is an inputted image memory (step 4009).

Following this, chart area extracting module 382 carries out processing (step 4010), and the flowchart of the processes is shown in FIG. 9. As a result, an image of only the chart area is extracted and outputted.

Figure 43:
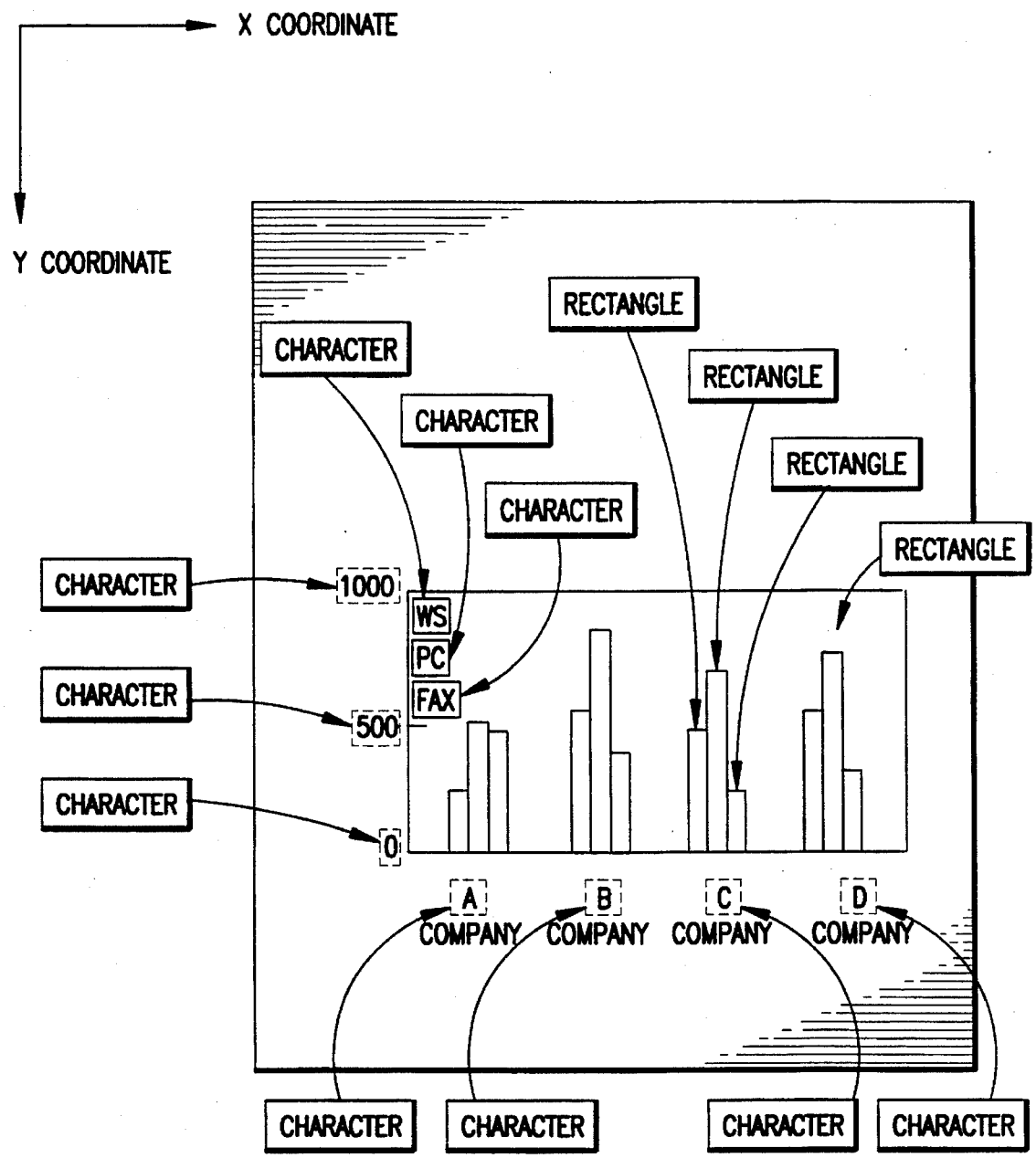
FIG. 43 shows an example of elements extracted by the chart area dividing module used in the fourth embodiment according to the present invention.

Chart area dividing module 383 then carries out processing with respect to this chart area and forms chart structure data (step 4011). For example, as shown in FIG. 43, the chart area dividing module checks whether the type of each element is a character block, a rectangle or another type and extracts the coordinate value of each element. Chart structure data includes, as shown in FIG. 44, numbers of elements, types of elements and coordinate values. Here, a coordinate value is shown by a combination of coordinates of points, which show the characteristics of the type of an element. For example, the coordinate value of a rectangle is shown by the x and y coordinate of the starting point (upper left point) and those of the ending point (lower right point), and the coordinate value of a character block is shown by the x and y coordinate of a rectangle including and bounding it. An element of a chart is shown not only by a coordinate value but also by other characteristic amounts, for example, in a case of a rectangle, it may be shown by a combination of the coordinates of the starting points, height and width.

Element attribute providing module 354 determines, for each element of the chart structure data, positional relation with respect to the whole chart in accordance with a type and a coordinate value of each element and identifies, considering the type of chart, an which part of the chart it acts (step 4012). As shown in FIG. 45, the element attribute providing module sends such data to the chart structure data as element attributes, and it sends the chart structure data with the element attributes to output image forming module 385. Here, as the type of the chart is a bar chart, the largest rectangle is regarded as "background" and other rectangles are regarded as "bars". Grouping is carried out based on the distance between each bar, and numbers are provided group by group to each bar from the left. Coloring individually group by group or bar by bar in each group is also possible by providing each group with a group number or providing each bar with both of a group number and a number provided to it in its group. As for character blocks, if a character block is below the rectangle of the background, the element attribute of it is regarded as "x graduation" if it is in the left (or right) side with respect to the rectangle of the background, the element attribute of it is regarded as "y graduation"; and, if it is close to a rectangle of a bar, the element attribute of it is regarded as "description". Here, "description" is a character string providing a description to a corresponding bar. A number which is the same as that of the closest bar is provided to a "description". The three rectangles in the upper left corner of the chart are remarks and it is regarded as impossible to identify on which part of the chart they act from the positional relation with respect to the whole chart. The character blocks provided near the rectangles cannot be identified either even though they are descriptions.

Figure 41A:
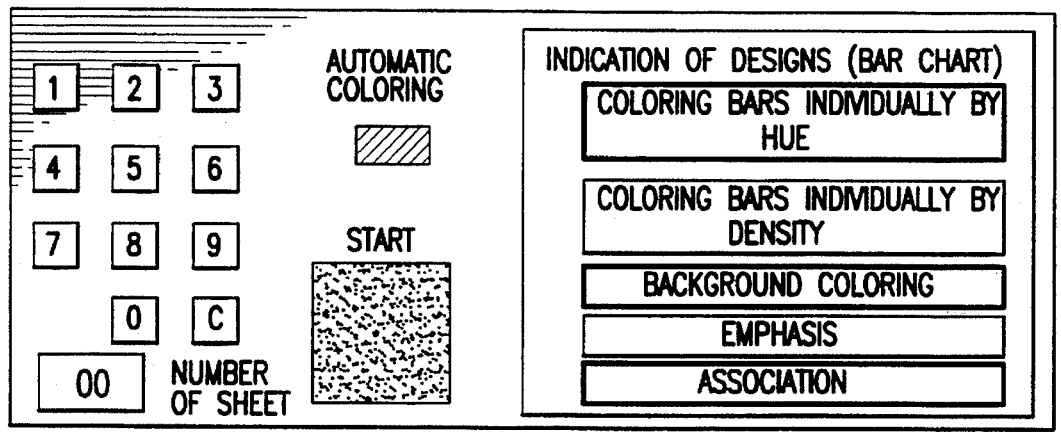
FIG. 41(a) is an operation panel for indicating designs.

On the other hand, design indicating module 388 displays selection buttons as shown in FIG. 41(a) so that the user can select designs among a plurality of designs (steps 4004 to 4007). If he selects "coloring bars individually by hue" and "background coloring", the information is sent to color arrangement parameter selecting module 389. By selecting "association", logical attribute indicating module 387 is started.

Figure 41B:
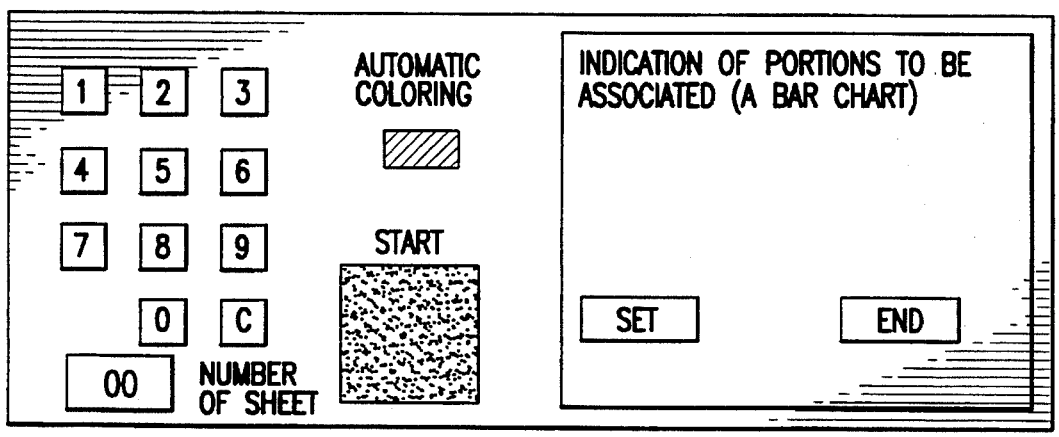
FIG. 41(b) is an operation panel for indicating an associated portion, whose color the portion in question is to copy.
Figure 42:
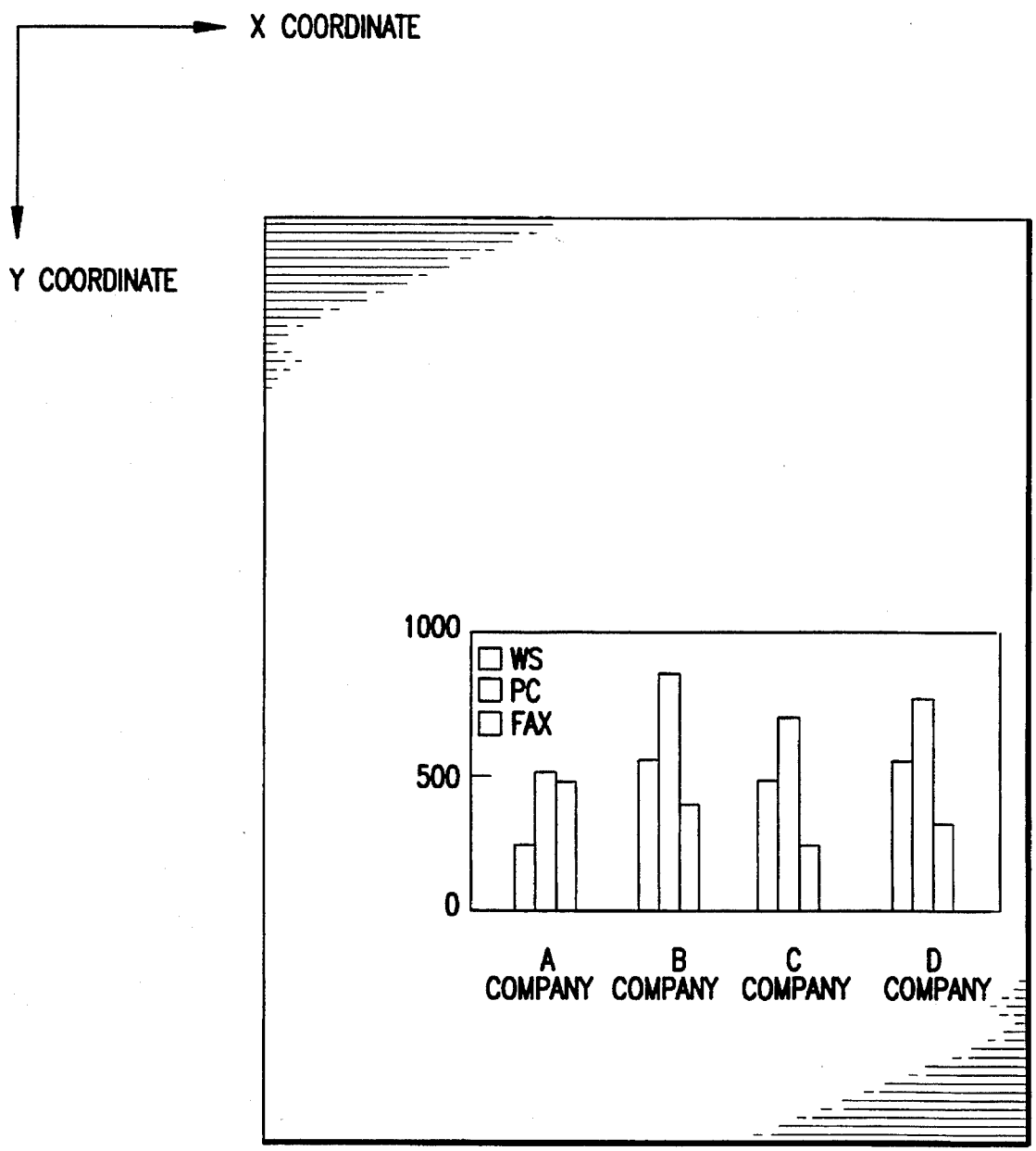
FIG. 42 shows an example of a result processed by the chart area extracting module used in the fourth embodiment according to the present invention.

Logical attribute indicating module 387 displays a panel as shown in FIG. 41(b) so that a user can indicate logical attributes, and here, a case wherein a portion whose color is to be copied is indicated is described as an example. When a user indicates on an editing pad a portion whose color is to be predetermined and then indicates the position of the area whose color is to be copied, logical attribute indicating module 387 compares the coordinate value of the portion indicated first with that of each element of the chart structure data, identifies in which element of the chart the coordinate value indicated first is included and changes the element attribute of the identified element into that of the area indicated next and identified in the same manner. For example, as shown in FIG. 46, the element attribute of three rectangles, which have been "?" are changed into "bar 1", "bar 2" and "bar 3" in accordance with the indicated logical attributes, wherein "bar 1", "bar 2" and "bar 3" are indicated so that their element attributes are to be copied. The element attribute of three character blocks, which have been "?" are changed into "description 1", "description 2" and "description 3" in accordance with the indicated logical attributes, wherein "description 1", "description 2" and "description 3" are indicated so that their element attributes are to be copied. In addition to association among elements such as copying the color of another element, local emphasis can be indicated as a logical attribute.

Figure 47:
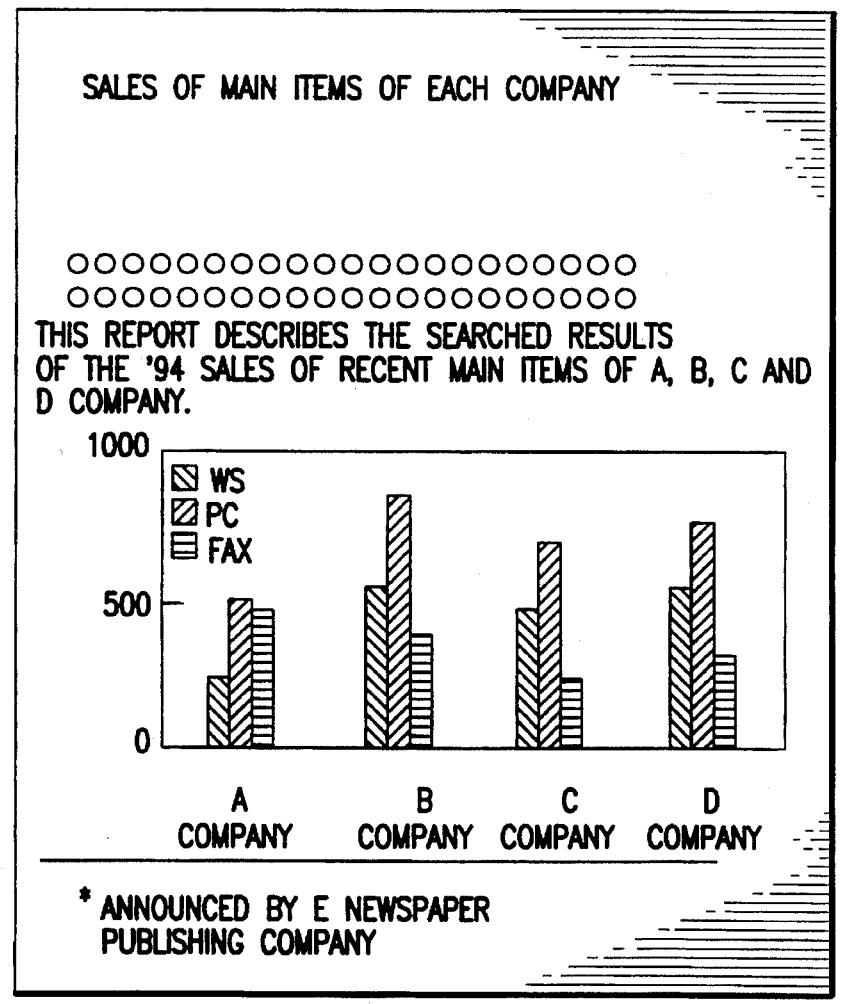
FIG. 47 shows an example of an outputted image wherein a bar chart is colored.

Color arrangement parameter selecting module 389 selects a color arrangement parameter table as shown in FIG. 47 corresponding to the selected designs among a plurality of color arrangement parameter tables 3891 stored in the ROM in advance, in accordance with the information outputted from design indicating module 388 and sends it to output image forming module 385.

Output image forming module 385 receives chart structure data to which element attributes are provided and converts the image data of the elements, referring to a color arrangement parameter regarding coloring a broken line chart and which is outputted from color arrangement parameter selecting module 389. If the element attribute of an element is "bar 1", the image data of the element is converted such that cyan is 45 percent, magenta is 15 percent, yellow is 15 percent and black is 0 percent. If element attribute of an element is "bar 2", the image data of the element is converted such that cyan is 45 percent, magenta is 45 percent, yellow is 15 percent and black is 0 percent. Further, if the element attribute of an element is "background", the image data of the element is converted such that cyan is 20 percent, magenta is 10 percent, yellow is 20 percent and black is 0 percent. Thus, image data of elements are converted as indicated by color arrangement parameters corresponding to the element attributes.

A document image including a bar chart wherein bars and descriptions for them are individually colored and the background is colored is transferred to output image memory 3861 of printing module 386. The formed outputted image is visualized on a recording medium such as a plain paper in accordance with a general full color image outputting process and, recorded and displayed as shown in FIG. 47 (step 4014). According to the fourth embodiment, a user can make charts colored with the optimum color arrangement by indicating the type of chart and selecting designs, and he can also make charts wherein indicated portions are emphasized or associated by simple indications of the portions to be emphasized or associated, even if he does not have knowledge of color arrangement. Thus, it is possible to make documents, such as charts, fulfilling their intended purpose.

(Modified Embodiment)

Charts to which processing carried out by the document processing device according to the present invention is applied are not restricted to ones such as a bar chart, a broken line chart and a circular chart, which are described in the above described embodiments. The processing can be applied to general charts such as a flowchart and a rader-chart. In each of the above described embodiments, in addition to a laser beam printer capable of full color printing, a printer capable of printing by black, which is the basic color, and one more color, or a printer capable of printing only by one color can be used for a printing module, by which printing with low cost and improved of printing speed can be expected. Here, however, as the number of usable color is restricted, it is necessary to change color arrangement parameters and the like, and decorating patterns such as screening can be used for supplementing the reduction of the number of colors.

In each of the above described embodiments, the document processing devices according to the present invention are applied to copying machines, however, they can also be applied to document making devices such as DTP or word processors. With them, complicated operations can be omitted by simple indications of designs. Here, chart structure data showing each element may be held as internal data.

What is claimed is:

1. A document processing device, comprising:

document image holding means for holding inputted documents as digital images;

chart area extracting means for extracting areas of charts included in document images held by said document image holding means;

chart area dividing means for dividing a chart area extracted by said chart area extracting means into elements and for extracting a type from a plurality of predefined types and a coordinate value of each element;

element attribute providing means for determining, for each of the elements divided by said chart area dividing means, positional relation with respect to a whole chart in accordance with the coordinate value of each element and for providing said positional relation as an element attribute, said element attribute providing means providing a number based on the type of element to each element;

output image forming means for extracting image data corresponding to each element and for forming an output image by coloring image data corresponding to each element identified by an element attribute in accordance with a parameter value, said parameter value corresponding to each element attribute of a color arrangement parameter table; and visualizing means for visualizing a document image formed by output image forming means on a visualizing medium.

2. The document processing device as claimed in claim 1, further comprising logical attribute indicating means for indicating, to elements of the chart, logical attributes not shown in an original document, said logical attributes based on intentions of a user, and wherein said element attribute providing means makes portions indicated by said logical attribute indicating means correspond to the elements divided by said chart area dividing means and changes element attributes of the elements in accordance with indicated logical attributes, in addition to determining, for each of the elements divided by said chart area dividing means, the positional relation with respect to the whole chart in accordance with the coordinate value of each element and for providing such data as an element attribute, a number corresponding to a type of element being provided to each element.

3. The document processing device as claimed in claim 1, further comprising design indicating means for selecting and indicating designs corresponding to the intentions of the user; and color arrangement parameter selecting means for selecting an optimum parameter table from among a plurality of color arrangement parameter tables; wherein said output image forming means extracts the image data corresponding to each element divided by said chart area dividing means from the document image held by said document image holding means and forms an output image by coloring the image data corresponding to each element, each element being identified by an element attribute provided by said element attribute providing means, in accordance with a parameter value, said parameter value corresponding to each element attribute of a color arrangement parameter table selected by said color arrangement parameter selecting means.

4. The document processing device as claimed in claim 1, comprising logical attribute indicating means for indicating, to elements of the chart, logical attributes not shown in an original document and based on the intentions of the user;

design indicating means for selecting and indicating designs corresponding to the intentions of the user; and color arrangement parameter selecting means for selecting an optimum parameter table from among a plurality of color arrangement parameter tables in accordance with the intentions of the user indicated by means of said design indicating means, wherein said element attribute providing means determines, for each of the elements divided by said chart area dividing means, the positional relation with respect to the whole chart in accordance with the coordinate value of each element and provides such data as an element attribute, a number corresponding to a type of element being provided to each element, and said element attribute providing means makes the portions indicated by said logical attribute indicating means correspond to the elements divided by said chart area dividing means and changes the element attributes of the elements in question in accordance with the indicated logical attributes, and said output image forming means extracts the image data corresponding to each element divided by said chart area dividing means from the document image held by said document image holding means and forms an output image by coloring the image data corresponding to each element identified by an element attribute provided by said element attribute providing means, in accordance with a parameter value, which corresponds to each element attribute, of the color arrangement parameter table selected by said color arrangement parameter selecting means.

5. The document processing device of claim 1, wherein the plurality of predefined types includes at least character and line segment types.

6. A document processing device, comprising:

document image holding means for holding inputted documents as digital images;

chart area extracting means for extracting areas of charts included in document images held by said document image holding means;

chart area dividing means for dividing a chart area extracted by said chart area extracting means into elements and for extracting a type from a plurality of predefined types and a coordinate value of each element;

element attribute providing means for determining, for each of the elements divided by said chart area dividing means, positional relation with respect to a whole chart in accordance with the coordinate value of each element and for providing said positional relation as an element attribute, said element attribute providing means providing a number based on the type of element to each element;

output image forming means for extracting image data corresponding to each element and for forming an output image by coloring image data corresponding to each element identified by an element attribute in accordance with a parameter value, said parameter value corresponding to each element attribute of a color arrangement parameter table;

logical attribute indicating means for indicating, to elements of the chart, logical attributes, not shown in an original document, said logical attributes based on intentions of a user; and visualizing means for visualizing a document image formed by output image forming means on a visualizing medium.

7. A document processing device, comprising:

document image holding means for holding inputted documents as digital images;

chart area extracting means for extracting areas of charts included in document images held by said document image holding means;

chart area dividing means for dividing a chart area extracted by said chart area extracting means into elements and for extracting a type from a plurality of predefined types and a coordinate value of each element;

element attribute providing means for determining, for each of the elements divided by said chart area dividing means, positional relation with respect to a whole chart in accordance with the coordinate value of each element and for providing said positional relation as an element attribute, said element attribute providing means providing a number based on the type of element to each element;

output image forming means for extracting image data corresponding to each element and for forming an output image by coloring image data corresponding to each element identified by an element attribute in accordance with a parameter value, said parameter value corresponding to each element attribute of a color arrangement parameter table;

color arrangement parameter selecting means for selecting an optimum parameter table from among a plurality of color arrangement parameter tables; and visualizing means for visualizing a document image formed by output image forming means on a visualizing medium.

* * * * *